United States Patent
Martin et al.

(10) Patent No.: US 10,743,322 B2
(45) Date of Patent: *Aug. 11, 2020

(54) COMMUNICATIONS DEVICE AND METHODS

(71) Applicant: Sony Corporation, Tokyo (JP)

(72) Inventors: Brian Alexander Martin, Basingstoke (GB); Lars Nord, Lund (SE); Anders Berggren, Lund (SE); Hideji Wakabayashi, Basingstoke (GB); Matthew William Webb, Basingstoke (GB)

(73) Assignee: Sony Corporation, Tokyo (JP)

( * ) Notice: Subject to any disclaimer, the term of this patent is extended or adjusted under 35 U.S.C. 154(b) by 81 days.

This patent is subject to a terminal disclaimer.

(21) Appl. No.: 16/199,263

(22) Filed: Nov. 26, 2018

(65) Prior Publication Data

US 2019/0110284 A1  Apr. 11, 2019

Related U.S. Application Data

(63) Continuation of application No. 15/126,058, filed as application No. PCT/EP2015/055855 on Mar. 19, 2015, now Pat. No. 10,159,081.

(30) Foreign Application Priority Data

Mar. 21, 2014 (EP) .................................. 14161201

(51) Int. Cl.
*H04W 72/04* (2009.01)
*H04W 4/70* (2018.01)
(Continued)

(52) U.S. Cl.
CPC ........... *H04W 72/048* (2013.01); *H04W 4/70* (2018.02); *H04W 72/0493* (2013.01);
(Continued)

(58) Field of Classification Search
CPC .......... H04W 56/0025; H04W 56/001; H04W 72/1247; H04W 56/0015
See application file for complete search history.

(56) References Cited

U.S. PATENT DOCUMENTS

2012/0300662 A1  11/2012  Wang et al.
2013/0170387 A1  7/2013  Wang et al.
(Continued)

FOREIGN PATENT DOCUMENTS

| EP | 0 993 214 B2 | 2/2014 |
| WO | 2015/113696 A1 | 8/2015 |
| WO | 2015/113720 A1 | 8/2015 |

OTHER PUBLICATIONS

European Search Report dated Nov. 26, 2018, issued in corresponding European Patent Application No. 18184298.

(Continued)

*Primary Examiner* — Asad M Nawaz
*Assistant Examiner* — Syed Ali
(74) *Attorney, Agent, or Firm* — Xsensus LLP

(57) ABSTRACT

A communications device, and method, is configured with at least one of an indication of first communications resources of the wireless access interface which can be allocated on request to the communications device by a mobile communications network for transmitting signals in one or more other communications devices in accordance with the first mode of operation or an indication of second communications resources of the wireless access interface, which can be used by the communications device for transmitting signals to one or more other communications devices in accordance with a second mode of operation using a device to device communications protocol.

18 Claims, 15 Drawing Sheets

(51) Int. Cl.
  *H04W 76/14* (2018.01)
  *H04W 72/10* (2009.01)
  *H04W 92/18* (2009.01)
(52) U.S. Cl.
  CPC ........... *H04W 72/10* (2013.01); *H04W 76/14* (2018.02); *H04W 92/18* (2013.01)

(56) References Cited

U.S. PATENT DOCUMENTS

| | | | |
|---|---|---|---|
| 2013/0288668 | A1 | 10/2013 | Pragada et al. |
| 2015/0173048 | A1 | 6/2015 | Seo et al. |
| 2015/0271791 | A1 | 9/2015 | Webb et al. |
| 2015/0271859 | A1 | 9/2015 | Huang et al. |
| 2015/0271861 | A1* | 9/2015 | Li ................. H04W 56/001 455/426.1 |
| 2015/0319724 | A1* | 11/2015 | Chae .................. H04W 8/005 370/315 |
| 2016/0014663 | A1 | 1/2016 | Berggren et al. |
| 2016/0037323 | A1* | 2/2016 | Kim ................. H04W 76/14 370/329 |
| 2016/0037549 | A1* | 2/2016 | Seo ................. H04W 72/1242 370/329 |
| 2016/0044620 | A1* | 2/2016 | Bagheri ............. H04W 76/14 370/252 |
| 2016/0149660 | A1* | 5/2016 | Seo ................. H04W 56/0015 370/336 |
| 2016/0345357 | A1 | 11/2016 | Fan et al. |
| 2017/0303260 | A1* | 10/2017 | Peng ................. H04W 76/14 |
| 2018/0034608 | A1 | 2/2018 | Seo et al. |
| 2018/0098337 | A1 | 4/2018 | Lee et al. |

OTHER PUBLICATIONS

Chinese Office Action dated Mar. 6, 2019, issued in corresponding Chinese Patent Application No. 201580015017.7.
Notification of Reasons for Refusal, issued in JP Application No. 2017-500423, dated Dec. 4, 2018 (with English Translation).
ZTE, Resource allocation for D2D communication, 3GPP TSG-RAN WG2 Meeting #85 R2-140693, Feb. 10-14, 2014, 7 pages.
Intel Corporation, Resource allocation for D2D communication, 3GPP TSG RAN WG2 Meeting #85 R2-140312, Feb. 10-14, 2014, 7 pages.
Ericsson, ST-Ericsson, Extended access barring mechanism for MTC devices,3GPP TSG-RAN WG2 #75bis R2-115086, Oct. 10-14, 2011, 8 pages.
ZTE, Discussion on the coordination of D2D resource for inter-cell D2D discovery and communication, 3GPP TSG-RAN WG3 Meeting #83 R3-140047, Feb. 10-14, 2014, 8 pages.
"CSMA/CA based resource selection," Samsung, 3GPP TSG-RAN WG2 #84, R2-133840, Nov. 11-15, 2013, 4 pages.
"Network control for Public Safety D2D Communications," Orange, Huawei, HiSilicon, Telecom Italia, 3GPP TSG RAN WG2 Meeting #84, R2-133990, Nov. 11-15, 2013, 5 pages.
"The Synchronizing Central Node for Out of Coverage D2D Communication," General Dynamics Broadband UK, 3GPP TSGRAN2#84, R2-134246, Nov. 11-15, 2013, 3 pages.
"Medium Access for D2D Communication," LG Electronics Inc., 3GPP TSG-RAN WG2 #84, R2-134426, Nov. 11-15, 2013, 8 pages.
"D2D Scheduling Procedure," Ericsson, 3GPP TSG-RAN WG2 #84, Tdoc R2-134238, Nov. 11-15, 2013, 7 pages.
"Possible mechanisms for resource selection in connectionless D2D voice communication," General Dynamics Broadband UK, 3GPP TSG-RAN2#84, R2-134248, Nov. 11-15, 2013, 9 pages.
"Simulation results for D2D voice services using connectionless approach," General Dynamics Broadband UK, 3GPP TSGAAC RAN2#84, R2-134431, Nov. 11-15, 2013, 6 pages.
R. Xiaogang, et al., "D2D Resource Allocation under the Control of BS," DCN 16/13/0123-02-000n, <https://mentor.ieee.org/802.16/dcn/13/16/0123-02-000n-d2d-resource-allocation-under-the-control-of-bs.docx>, 2013, 7 pages.
H. Holma, et al, "LTE for UMTS OFDMA and SC-FDMA Based Radio Access," Wiley, 2009, 4 pages.
"Study on LTE Device to Device Proximity Services," Qualcomm Incorporated, 3GPP TSG RAN Meeting #58, RP-122009, 2012, 6 pages.
G. Orfanos, et al., "A Centralized MAC Protocol With QOS Support for Wireless LANS," The 18th Annual IEEE International Symposium on Personal, Indoor and Mobile Radio Communications, 2007, XP31168598, 5 pages.
"Resource allocation for D2D communication," Intel Corporation, 3GPP TSG RAN WG2 Meeting #85, R2-140312, Feb. 10-14, 2014, 5 pages.
G. Orfanos, et al., "MC-CDMA Based IEEE 802.11 Wireless LAN," Proceedings of The IEEE Computer Society's 12th Annual international Symposium on Modeling, Analysis, and Simulation of Computer and Telecommunications Systems, 2004, 6 pages.
"3rd Generation Partnership Project; Technical Specification Group Services and System Aspects; Service accessibility;" 3GPP TS 22.011, V12.0.0, Technical Specification, Release 12, Mar. 2013, 26 pages.
"3rd Generation Partnership Project; Technical Specification Group Radio Access Network; Evolved Universal Terrestrial Radio Access (E-UTRA); Radio Resource Control (RRC): Protocol Specification," 3GPP TS 36 331, V11.6.0, Technical Report, Release 11, Dec. 20-13, 349 pages.
"Work item proposal on LTE Device to Device Proximity Services," Qualcomm Incorporated, 3GPP TSG RAN Meeting #63, RP-140518, Mar. 3-6, 2014, 7 pages.
International Search Report dated Jun. 11, 2015 in PCT/EP2015/055855 Filed Mar. 19, 2015.

* cited by examiner

Mode 1; In-coverage operation

Mode 2; Out of coverage operation

Operation of eNode when conditions for network access change

Operation of D2D UE in mode 1 or mode 2

COMMUNICATIONS DEVICE AND METHODS

CROSS-REFERENCE TO RELATED APPLICATIONS

This application is a continuation of U.S. patent application Ser. No. 15/126,058, filed on Sep. 14, 2016, which is a National Stage Entry of International Patent Application No. PCT/EP2015/055855, filed on Mar. 19, 2015, and claims priority to European Patent Application 14161201.0, filed in the European Patent Office on Mar. 21, 2014, the entire contents of which is hereby incorporated herein by reference in its entirety.

TECHNICAL FIELD OF THE DISCLOSURE

The present disclosure relates to communications devices and methods for communicating data using communications devices, and in particular to communications devices which are configured to perform device-to-device communications.

BACKGROUND OF THE DISCLOSURE

Mobile telecommunication systems, such as those based in the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications will be introduced.

D2D communications allow communications devices that are in close proximity to directly communicate with each other, both when within and when outside of a coverage area or when the network fails. This D2D communications ability can allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Fourth generation networks have therefore been proposed as a cost effective solution to public safety communications compared to dedicated systems such as TETRA, which are currently used throughout the world. However, the potential coexistence of conventional LTE communications and D2D communications within a single coverage area or network may increase the complexity of coordinating communications and resource allocation within a LTE network. In some applications a D2D communication must be performed urgently and so there may be a requirement to provide an arrangement in which a communications device can access communications resources without suffering congestion as a result of communications resources consumed by other communications devices.

SUMMARY OF THE DISCLOSURE

According to a first example embodiment of the present technique there is provided a method of communicating using a communications device via a wireless access interface to perform device-to-device communications. The method comprises configuring the communications device with at least one of an indication of one or more first communications resources of the wireless access interface which can be allocated on request to the communications device by a mobile communications network for transmitting signals to one or more communications devices or receiving signals from the one or more other communications devices in accordance with the first mode of operation, when the communications device is within a coverage area provided by the mobile communications network, and an indication of one or more second communications resources of the wireless access interface which can be used by the communications device for transmitting signals to one or more other communications devices or receiving signals from the one or more other communications devices in accordance with a second mode of operation using a device to device communications protocol, when the communications device is within the coverage area provided by the mobile communications network. The configuring of the communications device with the indication of the first and/or second communications resources may include pre-configuring the communications device during manufacture or receiving at the communications device information relating to the configuration of the first and second communications resources. The method further includes receiving, from the mobile communications network, an indication of whether the communications device can use at least one of the first communications resources of the wireless access interface for performing device-to-device communications in accordance with the first mode of operation or the second communications resources of the wireless access interface for performing device to device communications in accordance with the second mode of operation, and depending on the indication provided by the mobile communications network and the configuration of the first communications resources and/or the second communications resources, transmitting signals to the one or more other communications devices via the first communications resources allocated by the mobile communications network in accordance with a first mode of operation or receiving signals from the one or more other communications devices via the first communications resources, or transmitting signals to the one or more other communications devices via the second communications resources or receiving signals from the one or more other communications devices via the second communications resources in accordance with the second mode of operation using the device to device communications protocol.

Embodiments of the present technique can provide an arrangement for restricting or controlling communications devices, which are performing D2D communications so as to reduce or restrict access to communications resources for D2D communications in accordance with a priority given to the communications devices. The control may be initiated for example as a result of an emergency situation so that a priority can be given to communications devices performing D2D communications for supporting emergency services for example. In other examples access may be restricted to D2D communications resources in order to manage congestion for accessing the D2D communications resources.

According to some examples embodiments can provide an arrangement for supporting different types or classes of UEs, which are performing D2D communications. However, in order to support higher priority UEs such as public safety devices, in high load scenarios and/or high interference scenarios it may be necessary to provide some discrimination in the access to D2D communications resources.

Mobile communications networks conventionally include an arrangement for access control barring in which congestion is controlled. In accordance with an access probability value which is different for different classes of communications devices. Some embodiments of the present technique are arranged to combine the previously proposed access control barring with the access control indication for D2D communications, to the effect access control for D2D communications devices can be provided with a greater level of granularity for different classes of the communications devices.

Embodiments of the present technique can provide one or more sections or pools of communications resources, each pool of resources being associated with a resource allocation mode and may also be associated with additional parameters specifying which types or classes of communications devices are allowed to access those communications resources. This arrangement therefore provides an association of barring information/access rights with D2D communications resource pack and/or modes of communication.

In same examples the indications received by the communications device of whether the communications device can use at least one of the first communications resources of the wireless access interface for performing device-to-device communications in accordance with the first mode of operation, and the second communications resources of the wireless access interface for performing device to device communications in accordance with the second mode of operations is dependent upon one of a plurality of predetermined classes of communications devices.

Various further aspects, and features of the present disclosure are defined in the appended claims and include a communications device, a method of communicating using a communications device.

BRIEF DESCRIPTION OF DRAWINGS

Embodiments of the preset disclosure will now be described by way of example only with reference in the accompanying drawings wherein like parts are provided with corresponding reference numerals and in which.

DESCRIPTION OF EXAMPLE EMBODIMENTS

Conventional Communications System

Figure 1:
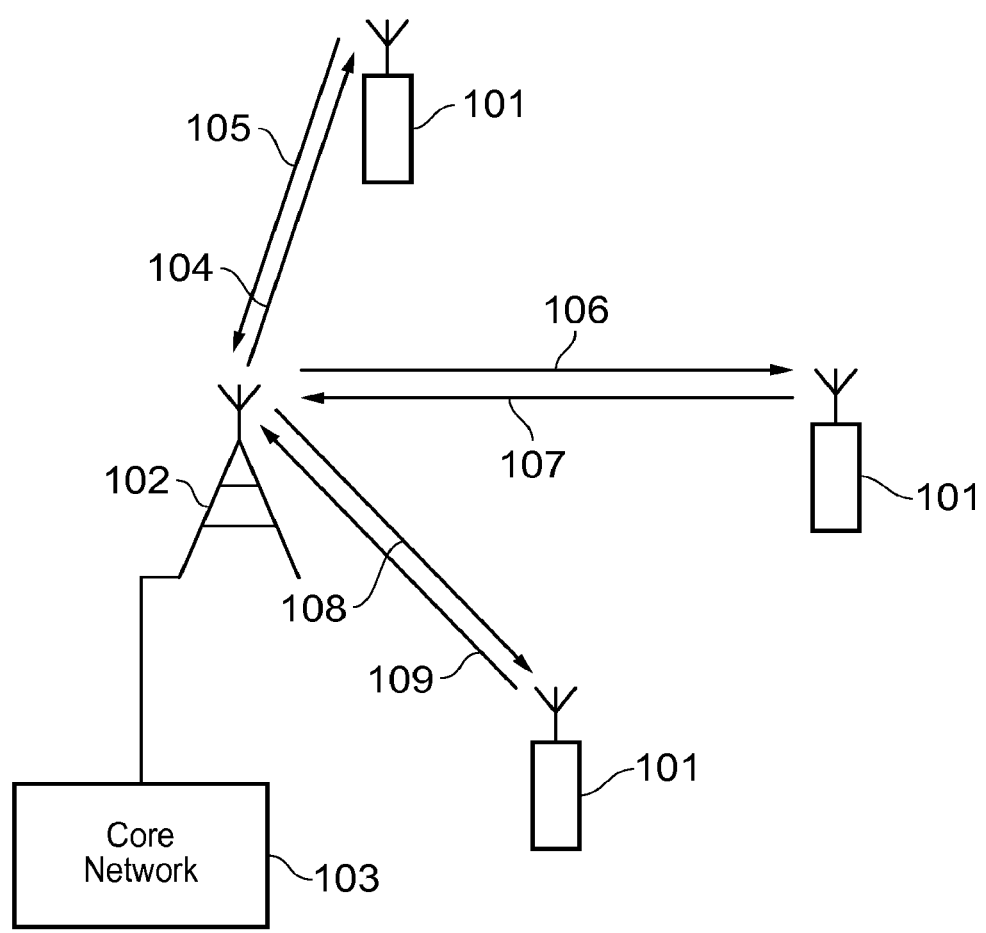
FIG. 1 provides a schematic diagram of a mobile communications system.

FIG. 1 provides a schematic diagram of a conventional mobile telecommunications system 106, where the system includes mobile communications devices 101, infrastructure equipment 102 and a core network 103. Use infrastructure equipment may also be referred to as a base station, network element, enhanced Node B (eNodeB) or a coordinating entity for example, and provides a wireless access interface to the one or more communications devices within a coverage area or cell. The one or more mobile communications devices may communicate data via the transmission and reception of signals representing data using the wireless access interface. The network entity 102 is communicatively linked to the core network 103 where the core network may be connected to one or more other communications systems or networks which have a similar structure to that formed from communications devices 101 and infrastructure equipment 102. The core network may also provide functionality including authentication, mobility management, charging and so on for the communications devices sensed by the network entity. The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links represented by lines 104 to 109, where 104, 106 and 108 represent downlink communications from network entity to the communications devices and 105, 107 and 109 represent the uplink communications from the communications devices to the network entity. The communications system 100 may operate in accordance with any known protocol, for instance in some examples the system 100 may operate in accordance with the 3GPP Long Term Evolution (LTE) standard where the network entity and communications devices are commonly referred to as eNodeB and UEs, respectively.

Figure 2:
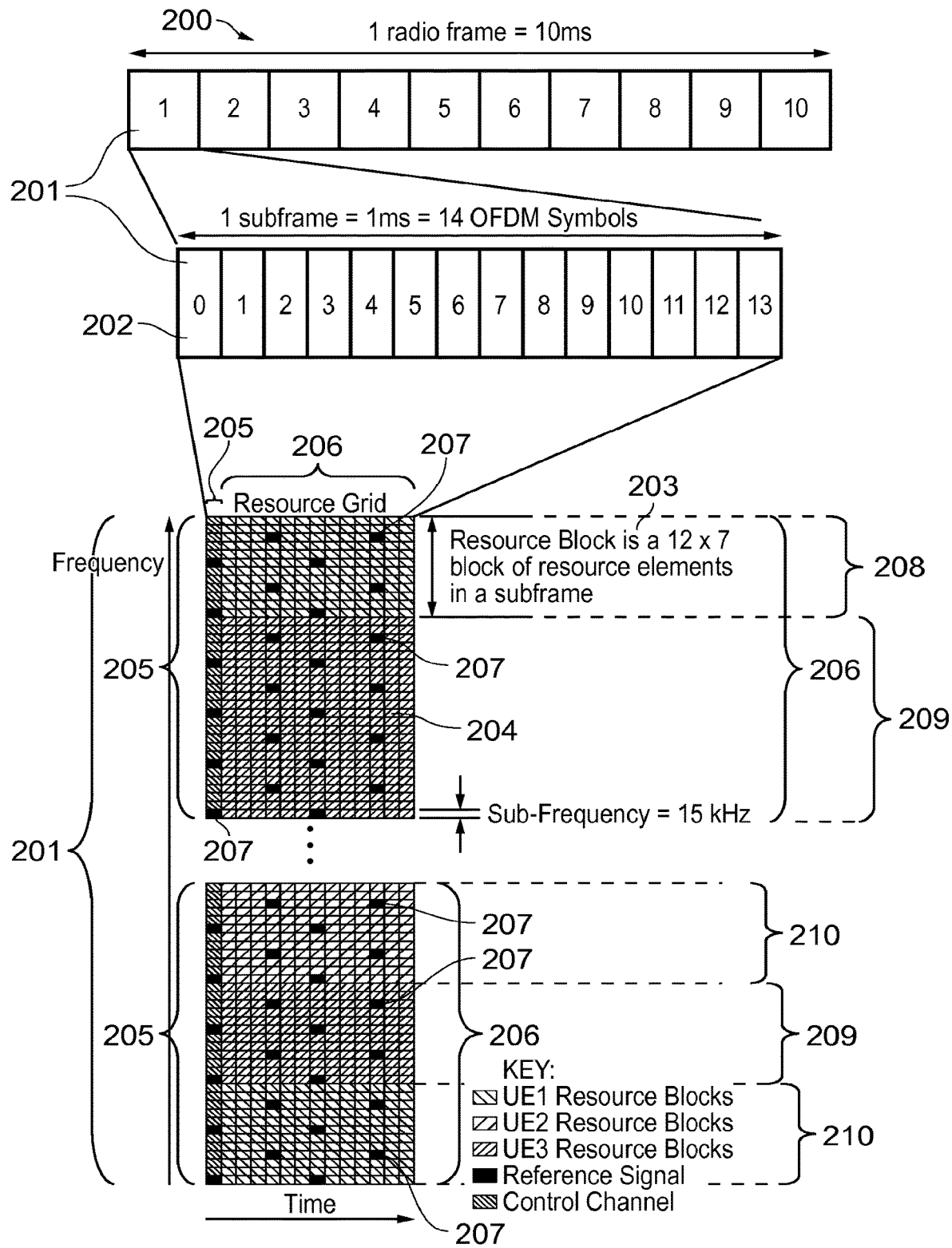
FIG. 2 provides a schematic diagram of the structure of a downlink of a wireless access interface of a mobile communications system.

FIG. 2 provides a simplified schematic diagram of the structure of a downlink of a wireless access interface that may the provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may the divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the redaction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [11].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in an LTE system may be allocated a fraction of the available resources of the PDSCH and therefore UEs are required to be informed of the location, of their allocated resources within the PBCSH so that only relevant data within the PDSCH is detected and estimated. In order to inform the UEs of the location of their allocated communications resources, resource control information, specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
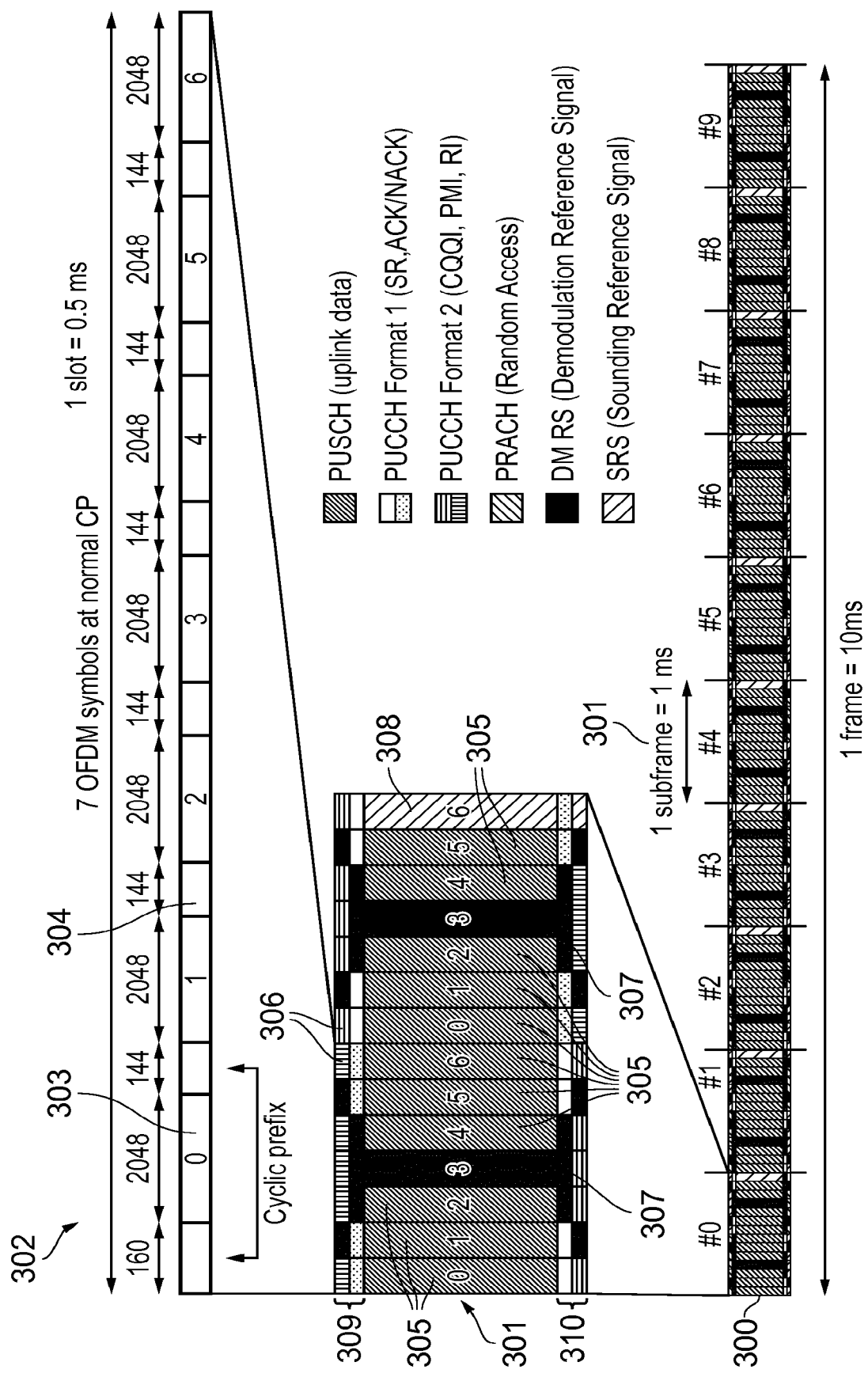
FIG. 3 provides a schematic diagram of an uplink of a wireless access interface of a mobile communications system.

FIG. 3 provides a simplified schematic diagram of the structure of an uplink of an LIE wireless access interface that may be provided by or is association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an PDD implementation. A frame 300 is divided in to 10 subframes 301 of 1 ms duration where each subframe 381 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner is downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of as uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PDSCH are required to be scheduled or granted by the serving eNodeB and thus if data is to be transmitted by a UE, resources of the PUSCH are repaired to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is so existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI is the PDCCH. Once or if the UE has PUSCH resource adequate to send a buffer state report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively, in OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

Device-to-Device Communications

D2D communications offer the possibility to address the aforementioned problems of network capacity and the requirement of network coverage for communications between LTE devices. For example, if user data can be communicated directly between UEs only one set of resources is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
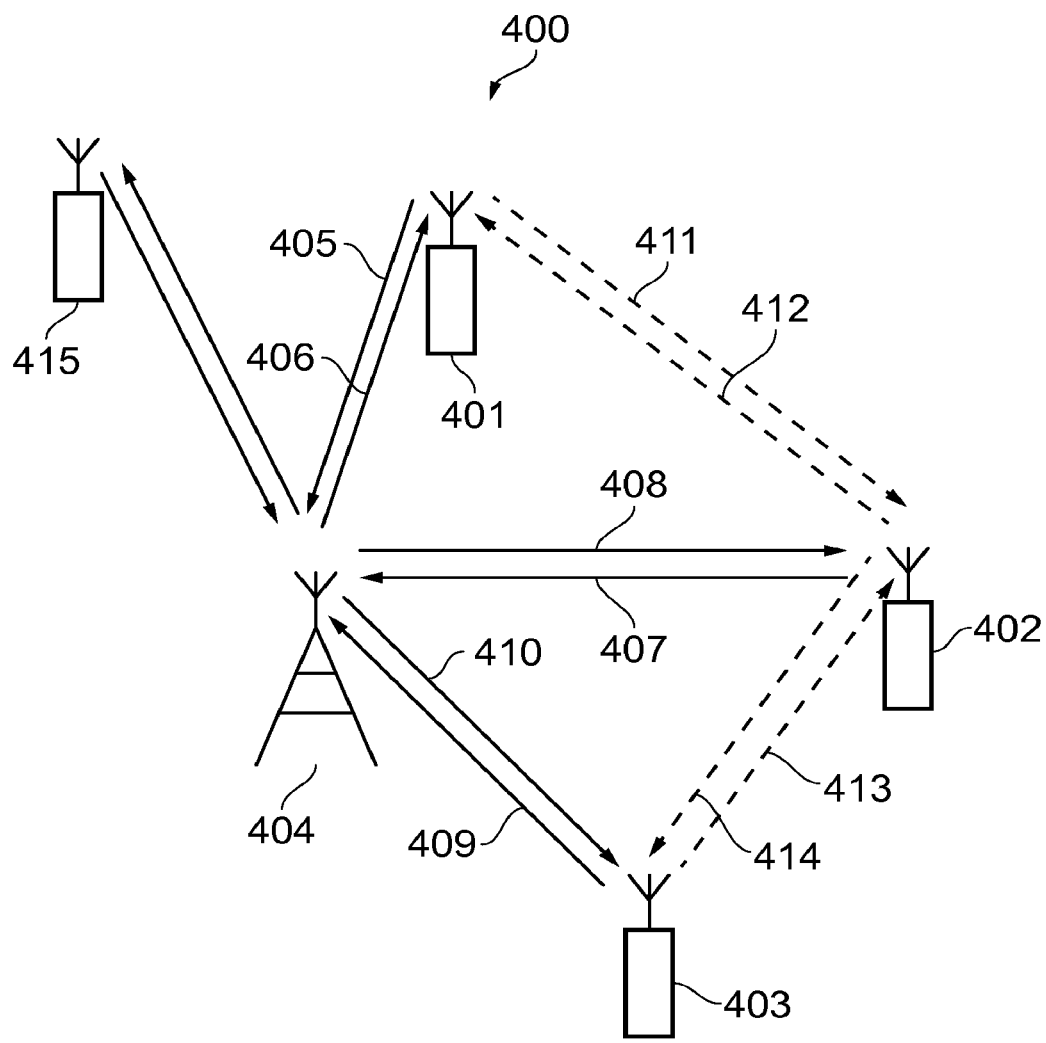
FIG. 4 provides a schematic diagram of a mobile communications systems in which communications devices can perform device-to-device communications.

FIG. 4 provides a schematic diagram of a mobile communications system 400 that is substantially similar to that described with reference to FIG. 1 but where the UEs 401 402 403 are also operable to perform direct device-to-device (D2D) communications with one another. D2D communications comprise UEs directly communicating data between one another without user and or control data being communicated via a dedicated coordinating entity such as an eNodeB. For example, in FIG. 4 communications between the UEs 401 402 403 415 and the eNodeB 404 are in accordance with the existing LTE standard, but as well as communicating via the uplink and downlinks 405 to 410, when the UEs 401 to 403 are within range of each other they may also communicate directly with one another via the D2D communication links 411 to 414. In FIG. 4 D2D communications links are indicated by dashed lines and are shown to exist between 401 and 402, and 402 and 403 but not between 401 and 403 because these UEs are not sufficiently close together to directly transmit and receive signals to and from one another. D2D communications links are also shown not to exist between 415 and other UEs because UE 415 is not capable of D2D communications. A situation such as that illustrated in FIG. 4 may exist in an LTE network where UE 415 is a device not compliant with the specifications for D2D operation.

In order to establish a D2D communications link, such a one-way D2D communications link 414 from the UE 402 to the UE 403, a number of steps are required to be performed. Firstly, it is beneficial for the initiating UE to have knowledge of the other D2D capable UEs within range. In an LTE system this may be achieved for example by each UE periodically transmitting a discovery signal containing a unique "discovery" identifier that identifies UEs to one another. Alternatively, a serving eNodeB or coordinating entity may compile a list of UEs within its coverage area capable of performing D2D communications and distribute the list to the appropriate UEs within its coverage area. By virtue of either of the above processes the UE 401 may discover UE 402, UE 402 may discover UEs 401 and 403, and UE 403 may discover UE 402. Once UE 402 is aware of the existence of UE 403 it may then proceed to establishing a D2D communications link with UE 403.

Previously Proposed D2D Systems

It has previously bees proposed to provide some arrangement for device to device communication within standards which define communications systems according to specifications administered by the 3GPP referred to as Long Term Evolution (LTE). A number of possible approaches to the implementation of LTE D2D communications exist. For example, the wireless access interface provided for communications between UEs and eNodeB may be used for D2D communications, where an eNodeB allocates the required resources and control signalling is communicated via the eNodeB but user data is transmitted directly between UEs.

The wireless access interface utilised for D2D communications may be provided in accordance with any of a number of techniques, such as carrier sense multiple access (CSMA), OFDM or a combination thereof for example as well as an OFDM/SC-FDMA 3GPP LTE based wireless access interface. For example it has bees proposed in document R2-133840 [1] to use a Carrier Sensed Multiple Access, CSMA, co-ordinations of transmission by UEs, which is un-coordinated/contention based scheduling by each UE. Each UE first listens then transmits on an unused resource.

In another example, UEs may communicate with each other by negotiating access to a wireless access interface directly, thus overcoming the need for a coordinating eNodeB. Examples of previously proposed arrangements include those in which one of the UEs of the group acts as a controlling entity to co-ordinate the transmissions of the other members of the group. Examples of such proposals are provided in the following disclosures:

[2] R2-133990, Network control for Public Safety D2D Communications; Orange, Huawei, HiSilicon, Telecom Italia

[3] R2-134246, The Synchronizing Central Mode for Out of Coverage D2D Communication; General Dynamics Broadband UK

[4] R2-134426, Medium Access for D2D communication; LG Electronics Inc.

In another arrangement, one of the UEs of the group first sends a scheduling assignment, and then transmits data without a central scheduling UE or controlling entity controlling the transmissions. The following disclosures provide, examples of this de-centralised arrangement:

[5] R2-134238, D2D Scheduling Procedure; Ericsson;

[6] R2-134248, Possible mechanisms for resource selection in connectionless D2D voice communication; General Dynamics Broadband UK;

[7] R2-134431, Simulation results for D2D voice services using connectionless approach; General Dynamics Broadband UK In particular, the last two contributions listed above. R2-134248 [6], R2-134431 [7], disclose the use of a scheduling channel used by UEs to indicate their intention to schedule data along with the resources that will be used. The other disclosure, R2-134238 [5], does not use a scheduling channel as such, but deploys at least some predefined resources to send the scheduling assignments.

Other example arrangements disclosed is [8] and [9] require a base station to provide feedback to the communications devices to control their transmissions. Document [10] discloses an arrangement in which a dedicated resource exchanging channel is provided between cellular user equipment and device-to-device user equipment for interference control and resource coordination.

As a result of the possible approaches to the organisation of a D2D devices and networks, a number of scenarios may arise. A selection of example scenarios are provided by FIGS. 5a to 5d where each may cause different problems regarding the allocation of resources, the operation of D2D communications alongside conventional LTE communication and the movement of D2D capable devices between coverage areas provided by eNodeBs.

Figure 5A:
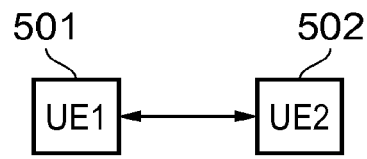
FIGS. 5a to 5d provides schematics diagrams of example device-to-device communications scenarios.

In FIG. 5a UEs 501 and 582 are outside of a coverage area of an eNodeB, consequently, the D2D devices may communicate with little or no regard for interference that may be caused by their D2D communications to neighbouring LTE networks. Such a scenario may occur in public safety communications for example, where either the UEs are outside of a coverage area or where the relevant mobile communications network is not currently functioning correctly. In such a scenario the communicating UEs may either negotiate directly with one another to allocate resources and coordinate communications, or one of the UEs or a third UE may act as a coordinating entity and therefore perform resource allocation.

Figure 5B:
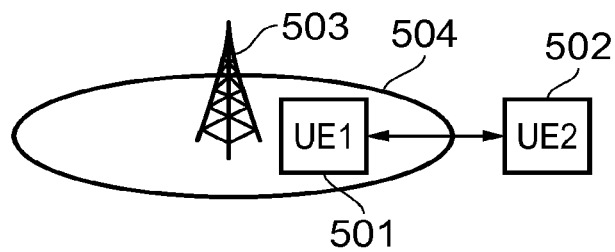

In FIG. 5b UE 501 is within a coverage area 504 of an eNodeB 503 and is performing D2D communications with UE 502 which is outside the coverage area 503. In contrast to the scenario of FIG. 5a, by virtue of UE 501 being within the coverage area of the eNodeB 583, D2D communications may cause interference to conventional LTE communications within the coverage area. Consequently, D2D resource allocations and transmissions may have to be coordinated around those within the coverage area 504 so conventional LTE communications are unaffected by D2D transmissions. This may be achieved in a number of ways, for example the eNodeB may coordinate the resource allocation for the D2D communications so that D2D resources and conventional LTE resources do not overlap. Any allocations may then be relayed to UE 502 by UE 501. Alternatively, UE 1 or UE2 via UE1 may for example perform resource allocation and then inform the eNodeB of the resources being utilised for D2D communications. The eNodeB will then reserve these resources for D2D communications.

Figure 5C:
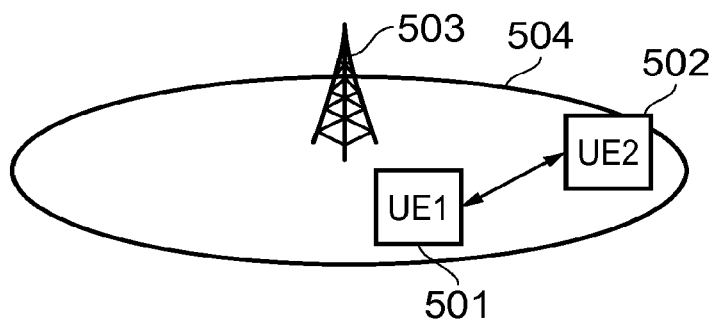

In FIG. 5c both UE 501 and 502 are within the coverage area of the eNodeB 503, consequently, coordination between the eNodeB and UEs will be required if D2D communications are to be performed without causing interference to conventional LTE communications within the coverage area. Such coordination may be achieved in a similar way to that described with reference to FIG. 5b but in the case of FIG. 5c UE 502 is also within the coverage area and therefore the relaying of resource allocation signals by UE1 to the eNodeB from UE 2 may not be required.

Figure 5D:
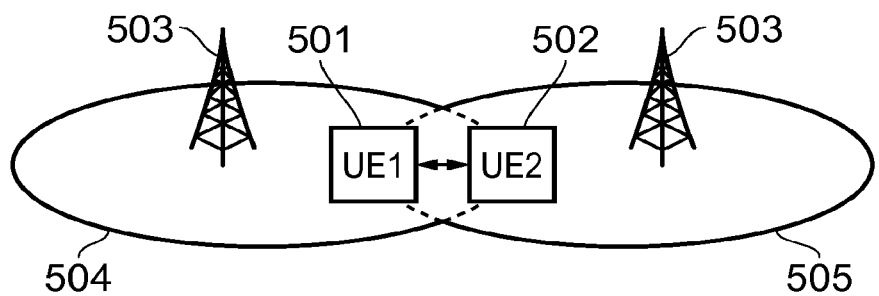

In FIG. 5d a fourth more complex D2D scenario is illustrated, where UE 501 and UE 502 are each within the coverage areas 504 505 of different eNodeBs 503 and 504 respectively. As for the scenarios of FIGS. 5b and 5c, coordination, between the UEs performing D2D communications will be required if interference between D2D communications and conventional LTE communications is to be avoided. However, the presence of two eNodeBs requires that resource allocations by the eNodeBs within the coverage areas 504 and 505 are required to be coordinated around the D2D resources allocations.

FIGS. 5a to 5d illustrates just four of a large number of possible D2D usage, scenarios, where further scenarios may be formed from combinations of those illustrated in FIG. 5a to 5d. For example, two UEs communicating as shown in FIG. 5a may move into the usage scenario of FIG. 5d such that there are two groups of UEs performing D2D communications in the coverage areas of two eNodeBs.

Once a D2D communications link is established, resources of the wireless access interface are required to be allocated to the D2D link. As described above it is likely that D2D communication will take place in spectrum allocated for LTE networks, consequently it has been previously proposed that when within a coverage area of an LTE network, D2D transmission are performed in the uplink spectrum and that SC-FDM is used. Furthermore, as one of the motivating factors behind D2D communication is the increase in capacity that may result, utilising the downlink spectrum for D2D communications is not appropriate.

Co-pending EP patent application EP14153512.0 discloses an arrangement in which communications devices which are configured to perform D2D communications, the contents of which are incorporated herein by reference. The communications devices are arranged to reserve shared communications resources, such as those of the PUSCH of an LTE Up-link, by transmitting a scheduling assignment messages in a predetermined section of resources, referred to as a scheduling assignment region, allocated for performing contentious access. As disclosed is EP14153530.2, the contents of which are incorporated herein by reference, a contention resolution procedure is adopted by the communications devices so that if one or more communications devices transmit scheduling assignment messages contemporaneously in the same section of the scheduling assignment region then the communications devices can detect the contentious access and re-try at a different time. The operation of communications devices can according to this D2D communications procedure access is summarised in Annex 1 for completeness.

Operating Modes for Device-to-Device Communications

As explained above with reference to the different scenarios depicted in FIG. 5a-5d, communications devices or UEs may perform D2D communications in different environments, depending on whether the UEs are within a coverage area provided by the eNodeBs of a mobile communications network or not. According to the present disclosure the scenarios mentioned above are summarised as being either within coverage and for which allocation of D2D communications resources is controlled by the eNodeB, which is referred to in the following description as mode 1, or acting autonomously whether in coverage or out of coverage of an eNodeB, which is referred to as mode 2, in which communications resources are accessed by the D2D UEs autonomously without being allocated by the eNodeB. These two modes of operation are presented in FIGS. 6 and 8, with a supporting explanation of an application of D2D communications which is a press to talk type operation between a group of D2D UEs.

Figure 6:
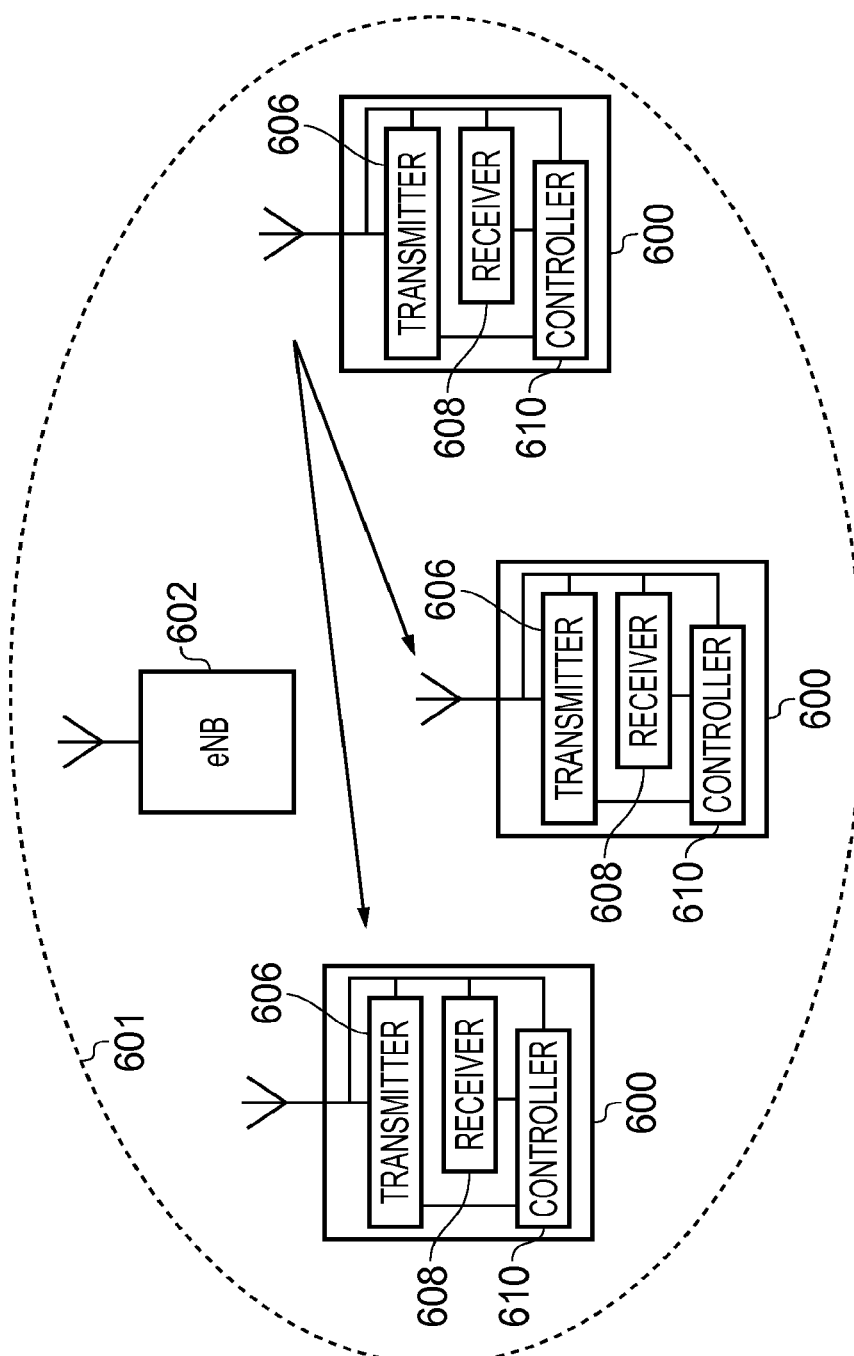
FIG. 6 provides a schematic block diagram illustrating an arrangement in which a plurality of communications devices form a group which perform device-to-device communications within a coverage area provided by a mobile communications network referred to mode 1 in the present disclosure.

FIG. 6 provides an example illustration of communications devices 600 which are operating within a coverage area represented by a dashed boundary line 601 provided by a base station or eNodeB 602. When D2D communications is performed within a coverage area provided by a mobile communications network then communications resources of a wireless access interface are provided under the control of the mobile communications network.

As shown in FIG. 6, each of the communications devices or UE's 600 includes a transmitter 606 and a receiver 608 which perform the transmission and reception of signals under the control of the controller 610. The controller 610 controls the transmitter 606 and the receiver 608 to transmit and receive data, between members of the group to perform D2D communications. However, as will be appreciated in this mode of operation, which is referred to as mode 1 operation access to the wireless access interface is determined and controlled by the eNodeB 602.

Figure 7:
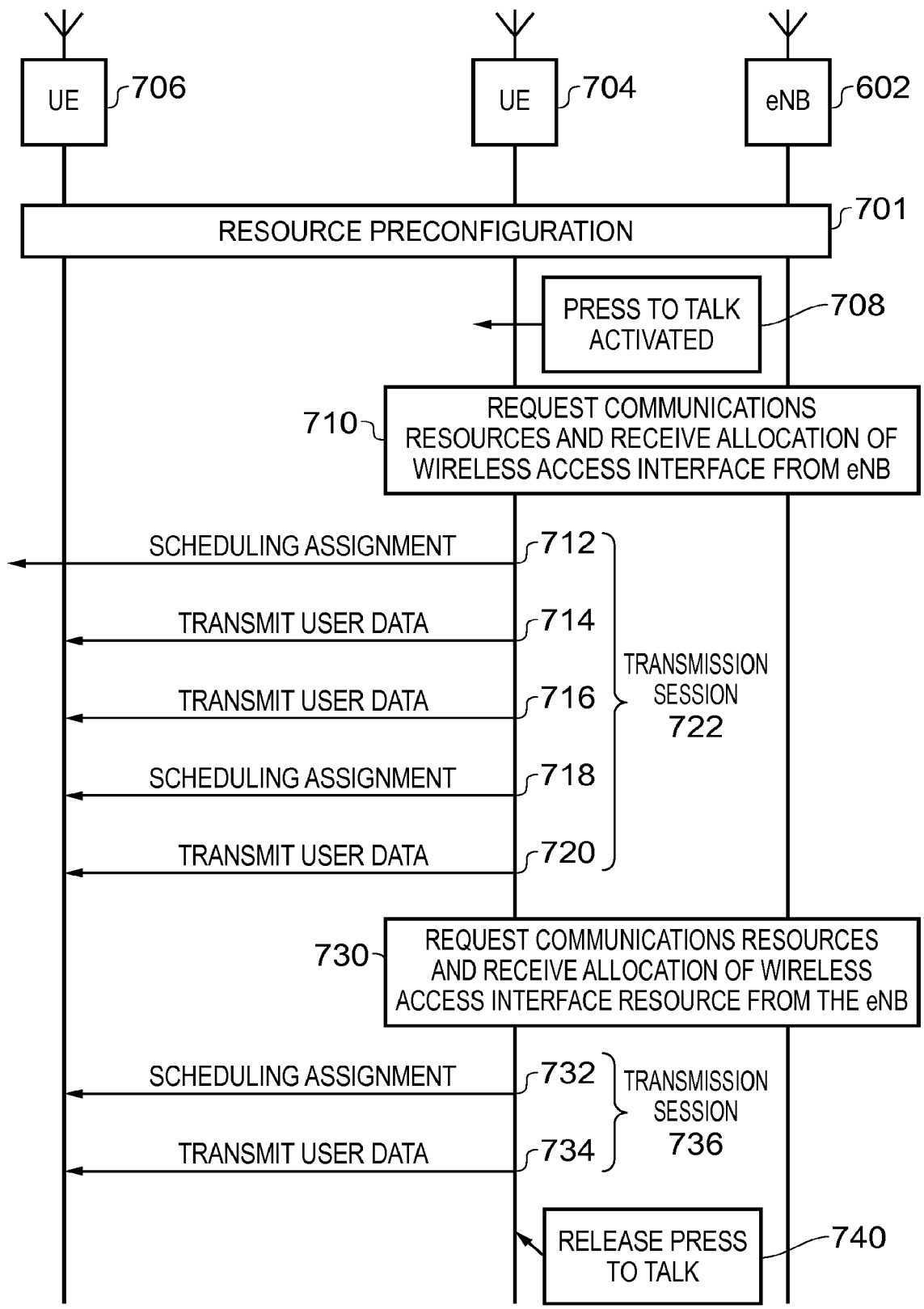
FIG. 7 is a flow diagram representing an example operation of communications device performing device to device communications in a press-to-talk (PTT) application when in a coverage area provided by a mobile communications network as represented in FIG. 6.

According to this example of the mode 1 operation, a procedure for performing D2D communications according to a press to talk type application for D2D communications is shown in FIG. 7, which is based in a disclosure provided in reference [5]. FIG. 7 provides a message sequence flow diagram illustrating a process in which a UE performs D2D communications within the coverage area 601 of an eNodeB 602 and therefore requests and receives allocations of communications resources from the eNodeB 602. As shown in FIG. 7 as a first part of the process the UEs 606 are arranged to be preconfigured for being allocating and accessing communications resources by being provided with encryption keys and authentication in a step 701. In step 702 a first communications device 701 wishes to transmit to other UEs is the group such as a UE 706 and to perform a press to talk activity as represented by a process step 708. According to one of the arrangements represented above the UE 794 then requests communications resources of a wireless access interface provided by the eNodeB 602 and receives a grant of communications resources of the wireless access interface from the eNodeB as represented in a process step 710. The first UE 704 then transmits a scheduling assignment message to the other UE in the group 706 using a message 712 and then transmits user data to the other UEs in the group on the steps 714, 716. A further scheduling assignment message may be sent 718 to continue to transmit user data to the other UEs 728. Thus the messages 712 to 720 represent the transmission session 722 for transmitting data to the other UEs. A further request for communications resources may be made in a step 730 to the other UEs to renew or receive a greater amount of communications resource from the eNodeB 602 as performed by a process step 730. A further scheduling assignment message 732 and user data transmission is performed in a further transmission session 736. Finally the UE 704 releases the press to talk request in a step 740 to release the communications resource, which have been allocated by the eNodeB 602 for the transmission for D2D communications.

Figure 8:
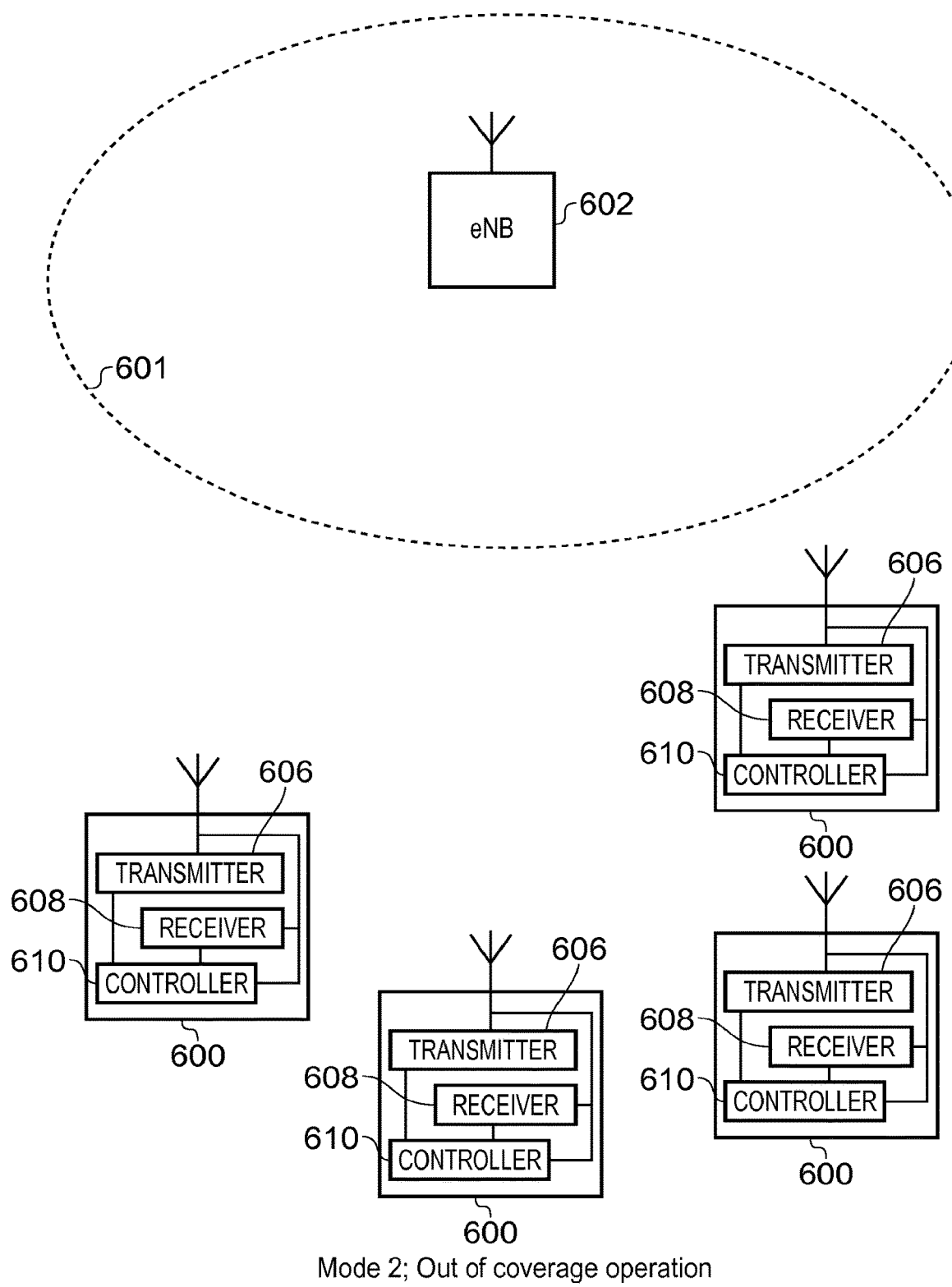
FIG. 8 provides a schematic block diagram illustrating an arrangement in which a plurality of communications devices form a group which perform device-to-device communications outside a coverage area provided by a mobile communications network and therefore operate autonomously which is referred to mode 2 in the present disclosure.
Figure 9:
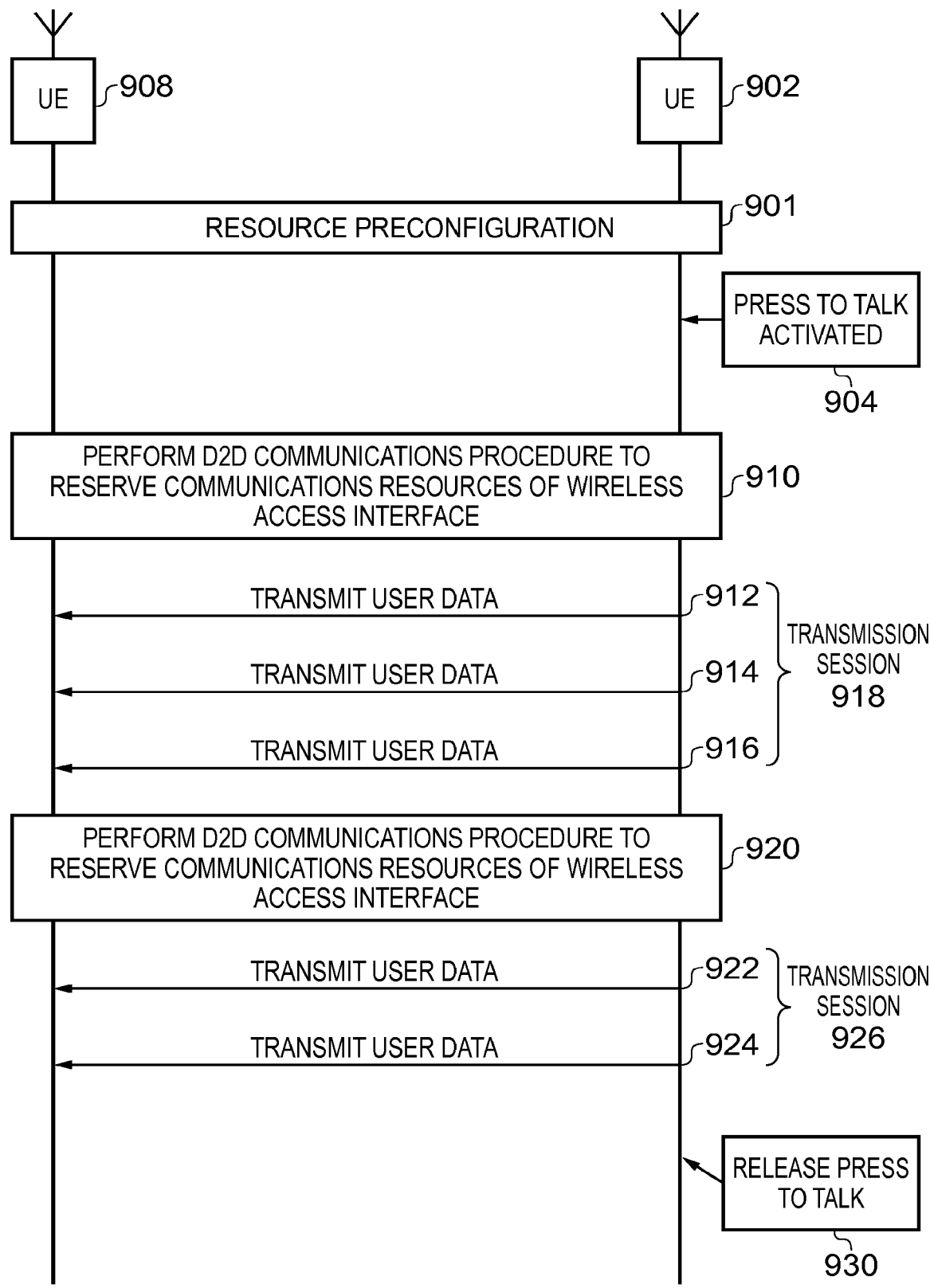
FIG. 9 is a flow diagram representing an example operation of communications device performing device to device communications in a press-to-talk (PTT) application when outside a coverage area provided by a mobile communications network as represented in FIG. 8.

A further example mode of operation as explained above is referred to as a mode 2 in which D2D communications are performed in an out of coverage mode in which the communications devices or UEs are outside a coverage area 601 of the base station 602 as represented in FIG. 8 which corresponds substantially to the example showing in FIG. 6 which corresponds to an in coverage operation of mode 1. Thus as tea in FIG. 8 the UE's 600 are outside the boundary 601 and therefore are outside a coverage area provided by the eNodeB 602. Whether or not the UE 610 is within a coverage area of the eNodeB 602, can be determined in accordance with predetermined conditions such as a downlink received signal strength indication which for example may be below a predetermined threshold. Thus the transmitter, the receiver and the controller 606, 608, 609 may determine in accordance with the received signal strength that the downlink transmissions from eNodeB are below a predetermined threshold and therefore conclude that the UE is operating outside a coverage area provided by the eNodeB 602. Accordingly, for the press to talk example as shown in FIG. 7, a message flow diagram corresponding to a press to talk operation in the mode 2 operation that is shown in FIG. 9. FIG. 9 is explained as follows:

As shown in FIG. 9, during a first process step, corresponding to step 701 in FIG. 7, the UEs perform, a pre-configuration in which authentication and encryption keys are exchanged or provided by a communications network in order that the UEs can communicate via the wireless access interface. Thus in the first step resource configuration is performed 901. A first UE 902 then performs a press to talk activity as represented by a press to talk activated step 904. In a process step shown generally as a D2D communications procedure the first UE 902 performs a procedure to reserve communications resources of the wireless access interface in order to form a D2D communication to the second UE 908. The second UE 908 may be one device although there are other devices of the group available who may receive the communication from the first device 902. Having reserved the communications resources on the wireless access interface the first UE 902 then transmits user date to the other devices in the group 908 as represented by message transmission arrows 912, 914, 916. Accordingly, the transmission messages 912, 914, 916 are represented generally as a transmission session 918.

In a further operation, the first UE 902 may perform a further D2D communications procedure to reserve communications resources of a wireless access interface 920 which may be required in order to renew the reservation or to reserve further resources as required. According, further transmissions occur 922, 924 in a further communications session 926. Finally after press to talk function is released in a step 930 so that the reserved resources are released by the UE 902.

According to the agreements above, the UE should use mode 1 when in-coverage of the network. For mode 1 operation, the UE has to be RRC Connected before mode 1 can operate. As will be appreciated there are some advantages for arranging that whenever the UE is in-coverage (according to the current definition: the cell being suitable) then the UE should establish an RRC Connection with the network and then the network schedules specific resources for the UE.

According to some examples, the mobile communications network can control whether mode 1 or mode 2 can be allowed. For example enabling mode 1 or 2 via system information, for example 1 bit indication for
 Mode 2 allowed in-coverage and/or out-of-coverage
 Mode 1 required (mode 2 not allowed) or mode 2 allowed in-coverage.

A problem can be perceived if a UE is required to operate in mode 1, because the UE would have to establish and as RRC connection from idle mode. As such, a UE, which is in a suitable cell, in idle mode, will delay any public safety or any other D2D communication by an amount of time which it takes to establish an RRC connection and request D2D resources, and an eNodeB to allocate the resources. Under normal operating conditions a delay for communications earned by the UE having to move from idle to RRC connected state, would be a few hundred milliseconds, which does not represent a significant delay to establishing communications. However in some situations, particularly in a congested network, this delay may be unacceptable, or may even prevent a public safety device from being able to operate.

One example is that in case of a disaster, such as earthquake, bombing, or any situation, which respires D2D communications devices operated by emergency services to function, provide examples in which a mobile communications network may become congested because many people may attempt to call, or test friends and relatives. This can cause congestion on PRACH and as a result the network may not be able to serve all UEs. This PRACH failure could also be earned by temporary interference, or even core network or an eNodeB failure.

In a prior art document EP 0993314 [15] discloses an arrangement in a CDMA wireless access interface in which radio access channel resources provided by the wireless access interface are divided between different types of access as a priority basis. Higher priority access types receive more physical resources for random access. This arrangement provides an improvement in a possibility of gaining access to the network due to the higher probability that a particular message will be successful in a contentious access. Therefore, more important UE classes can have a higher probability of a successful contentious access.

For an example in which a mobile communications network becomes congested, the network could be arranged to set access class barring to prevent normal users from accessing a cell. Assuming that a public safety device will have a special access class (access classes 11-15 reserved for special devices) then these devices may be able to access the cell. However, updating access class barring parameters may take some time. Furthermore there are some network failure scenarios, which could prevent the communication of system information. In addition, even if the UE is able to establish a connect then the resource allocation may be unreliable in volatile circumstances.

Access Control for D2D Communications

The embodiments of the present technique can provide an arrangement for restricting or controlling communications devices, which are performing D2D communications. The control may be initiated for example as a result of an emergency situation so that a priority can be given to UEs performing D2D communications for supporting emergency services for example. In other examples access may be restricted to D2D communications resources in order to manage congestion for accessing the D2D communications resources. Embodiments of the present technique can provide an arrangement for supporting different types or classes of UEs which are performing D2D communications. However, in order to support higher priority UEs such as public safety devices, in high load scenarios and/or high interference scenarios it may be necessary to provide some discrimination in the access to D2D communications resources. Far a cellular network, it is possible to control the load by barring different classes of UE (access class barring) or providing a probability of access.

Embodiments of the preset technique can provide one or more sections or pools of communications resources, each pool of resources and/or resource allocation mode being associated with additional parameters specifying which types of UE are allowed to access those communications resources, associating barring information/access rights with D2D communications resource pools and/or modes of communication.

As will be appreciated from the explanation provided above, D2D communications resources can be viewed as comprising at least three types, which are:

1) Out of coverage resource pool
   These resources are used by a transmitting UE which is not in the coverage of an eNodeB.
   This type of operation is intended only for the public safety UEs.
2) Edge-of-coverage resources/mode 2 in-coverage pool
   This is a mode of operation whereby the UE selects resources autonomously from a pool of resources broadcast by the eNodeB to a UE which is in a coverage area for radio communications with the eNodeB of.
   UE either does not have an RRC Connection to perform mode 1, or the network has configured that the UE will use mode 2 instead of mode 1.
   This may be applicable for commercial D2D devices as well as public safety devices
3) in-coverage scheduled resource pool/mode 1
   The eNodeB schedules specific resources to the transmitting D2D UE while UE has RRC Connection to the cellular network.
   This may be applicable for commercial D2D devices as well as public safety devices For at least the examples according to communications resource pools of types (2) and (3), it is possible that many UEs in the cell may came congestion. In particular in mode 2, this could prevent public safety UEs from gaining access to a communications resource if a single resource pool is provided for all UEs. It is also possible that mode 1 can be congested.

Embodiments of the present technique can provide an arrangement in which for each of a plurality of communications resources pools, an indication is provided to each of a plurality of different types or classes of UEs as to whether or not UEs of that type are allowed access to the communications resources of the pool.

This might be done by a single indication, which informs the UE that the resource pool is for public safety only, commercial UE only, or all types of UE. In one example the mobile communications network can provide a plurality of different resource pools for use for example by UEs operating in mode 2 for D2D communications. A public safety device may use the resource pool indicated for use in public safety, and a commercial device may use another resource pool, so that some resources are specifically assigned for public safety, presenting commercial UEs from taking those resources.

For example, UEs which are configured to operate in mode 2 could be signaled along with an associated mode 1 communications resource pool, to apply only to public safety devices, while mode 1 may the specific for commercial devices or all devices. In this case it would be mode 2 operation and the associate communications resource pool that was restricted to public safety devices.

Figure 10:
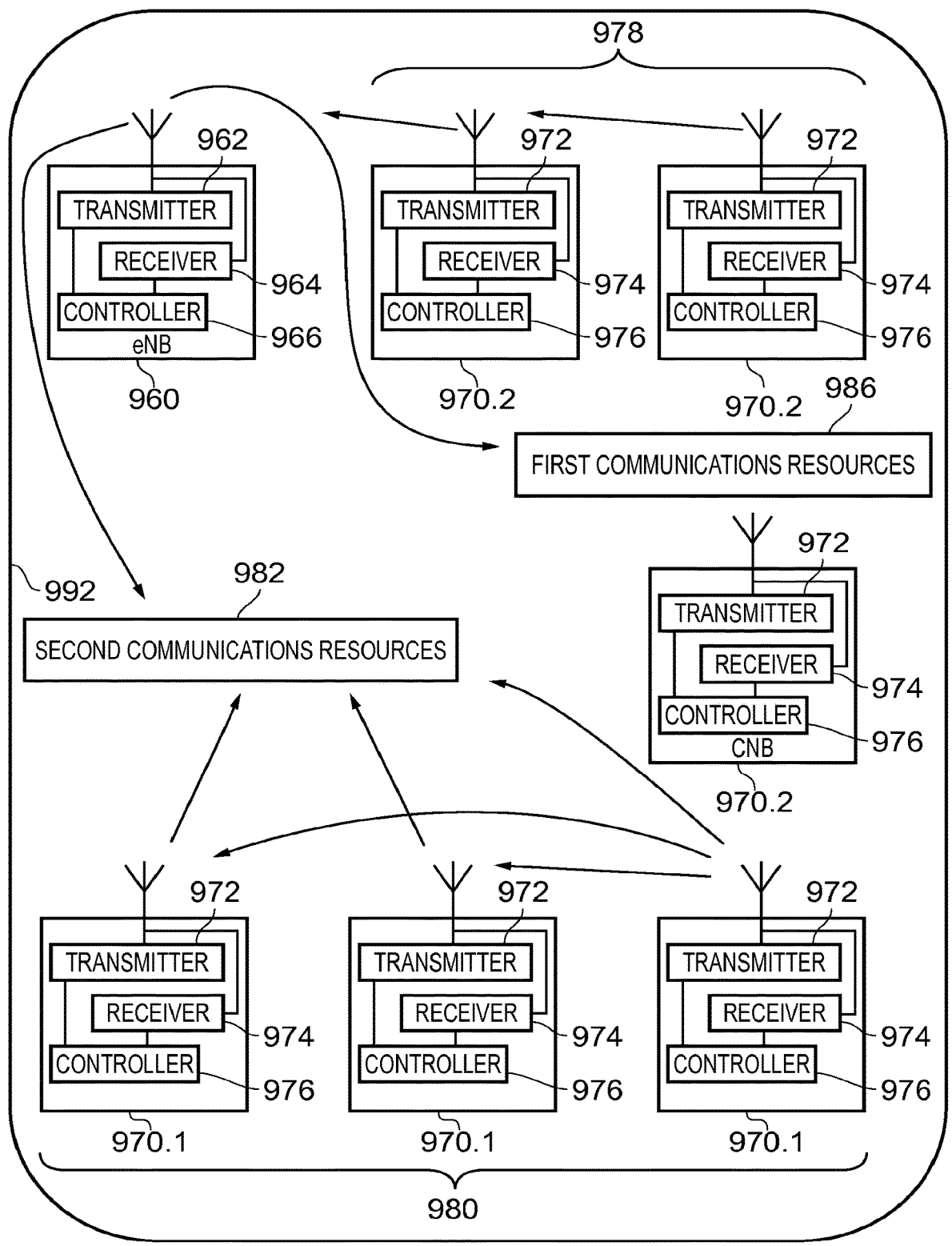
FIG. 10 is a schematic block diagram representing a plurality of communications devices performing D2D communications using different pools of communications resources and different multiple access modes.

An example embodiment of the present technique is showing in FIG. 10. In FIG. 10 an eNodeB 960 is shown to comprise a transmitter 962, a receiver 964 and a controller 966. Also shown in FIG. 10 a plurality of UEs 970 each include a transmitter 972, a receiver 974 and a controller 976. The controller controls the transmitter and the receiver 972, 974 in order to transmit and receive data via the eNodeB 960 or to perform D2D communications as explained above. As shown in FIG. 10, two groups 978, 980 three UE's 970.1, 970.2 are each performing D2D communications with each other using different communications resources. A first group of UEs 978 perform D2D communications using mode 1 operation using first communications resources represented a block 986. The second group of UE's 980 performs D2D communications is accordance with mode 2 operation using a second group of communications resources represented by a box 912. The second communications resources 982 may for example be reserved for supporting D2D communications at the edge or within a certain part of a coverage area represented by a broken 992.

As explained above, the UE's 970 can perform D2D communications using mode 1 in which access to the first communications resources 986 is controlled by the eNodeB 968 in which the UE's request and are granted one or more resources from within the first communications resources 986 to perform D2D communications to the other UEs within the group. Other UEs may operate in mode 2 in which D2D communications are performed in accordance with a D2D communications protocol using the second communications resources 982. Therefore, for example the second group of UE's 980 may perform contentious access for the second communications resources 982.

As explained above, according to the present technique the eNodeB 960 transmits to the UE's 970 an indication as to whether or nor they can use either the first communications resources 986 or the second communications resources 982 or both.

In some examples, this access to the first and second communications resources 982,986 would depend on a class of the communications devices. As explained above, communications devices, which provide a press-to-talk application used by the emergency services may be in a different class and therefore have a higher priority than commercial UEs. Accordingly, the commercial UEs may be restricted to using the first communications resources 986 in mode 1 operation.

Figure 11:
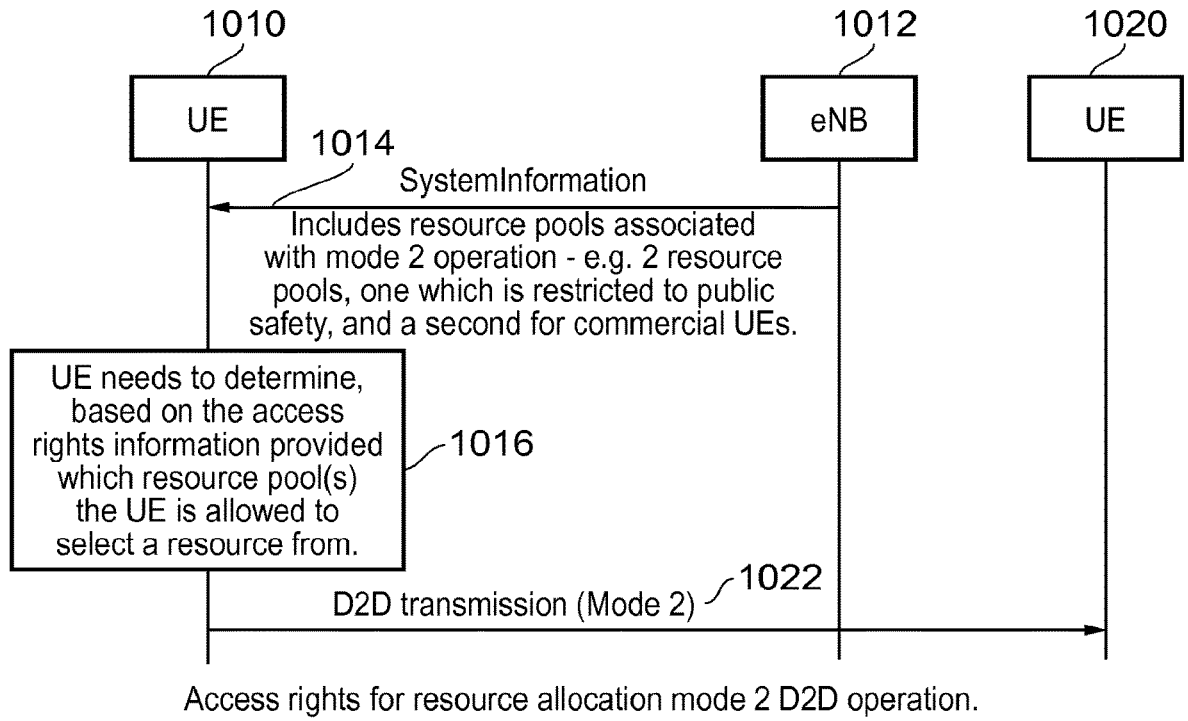
FIG. 11 is a message flow diagram representing an operation of a communications system according to an example of the present technique, in which a communications device is signalled access rights for resource allocation to a mode 2 D2D operation.

As shown by the message flow diagram shown in FIG. 11, access rights are granted to UEs 1010 by an eNodeB 1012 by transmitting system information periodically to UEs which support communicating using D2D communications. The system information is transmitted in a message 1014, which identifies resource pools associated with mode 2 operation that is the second communications resources. In some examples, the second communications resources may comprise two resource pools, one which is restricted to public safety rules and the other which is restricted to commercial rules. In a process step 1016 the UE 1010 is configured to determine, based on the access rights information received in the system information from the eNodeB the communications resource pools to which the UE is allowed access to select and therefore perform D2D communications in accordance with mode 2 operation. Accordingly, after selecting one of the resource, pools allocated to the UE in accordance with its class, the UE transmits a D2D transmission to another UE 1020 within its grasp as represented by a message transmission 1022.

The receiving UE also needs to know the resource pools, which it should monitor, so the receiving UE can also use the barring information to determine which communications resource pools may contain data which it should receive (e.g., allowing UE to monitor only the public safety resource pool or pools). If the receiving UE belongs to a class that is temporary barred from all D2D communication, then the UE can refrain from monitoring until next broadcast indicating that the UE is no longer barred. A barring timer may be provided and used in a similar way to the existing Tbarred used for cell barring.

For an example in which the network restricts the UEs operating to perform D2D communication in mode 1 operation, the UE can be arranged to determine whether it is allowed to initiate RRC Connection establishment to perform a mode 1 D2D communication.

Based on the access control check, the UE may determine which mode of operation the UE should use. For example a UE may perform an access control check on a mode 2 communications resource pool, which it fails (the probability check may fail) and as a result the UE selects mode 1 and initiates an RRC Connection establishment procedure. This example operation is presented in FIG. 12.

Another example would be that mode 2 operation is allowed, but restricted to public safety devices. This means a commercial device always fails the mode 2 access rights check and has to be RRC Connected to use mode 1 operation, whereas a public safety device may use mode 2 (potentially based on other additional criteria also such as a received DL power threshold)

Figure 12:
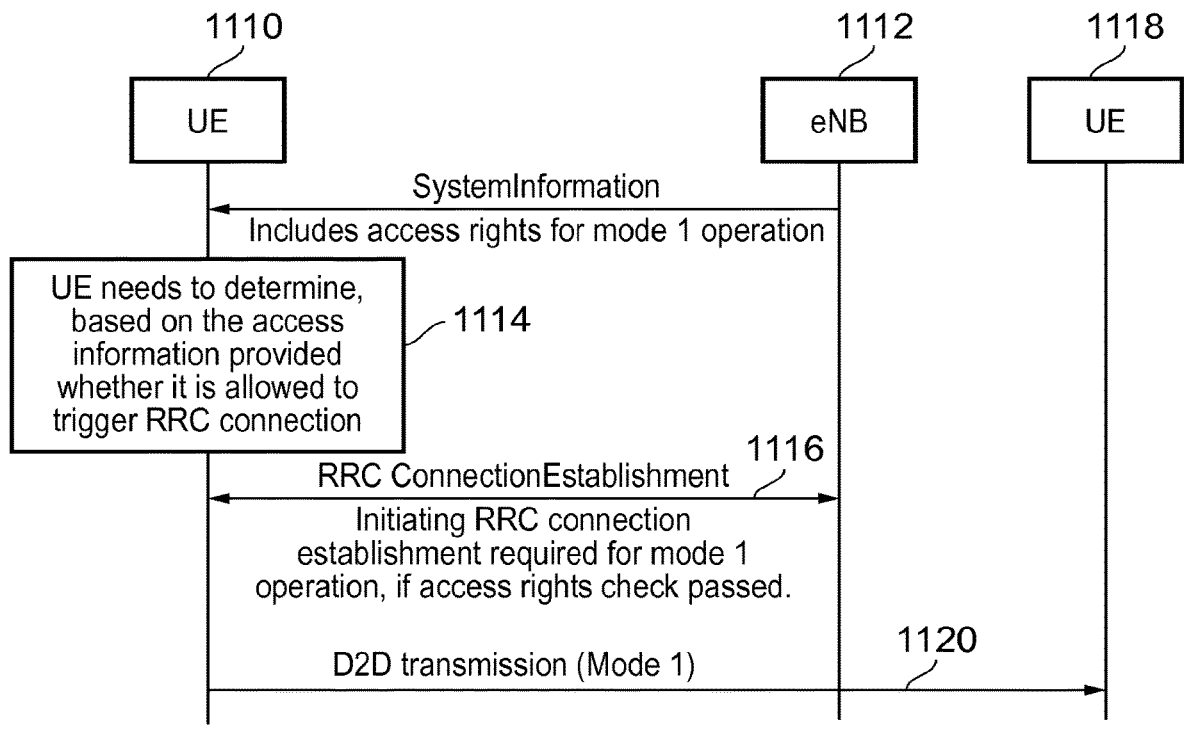
FIG. 12 is a message flow diagram representing an operation a of a communications system according to an example of the present technique, in which a communications device is signalled access rights for resource allocation in a mode 1 D2D operation.

An example in which access rights are communicated to UE's performing D2D communications is shown in FIG. 12. In FIG. 12 a UE 1110 receives system information from an eNodeB 1112 indicating access rights of the UE for mode 1 operation. Thus periodically the eNodeB 1112 transmits system information to, for example, the first group of UE's shown in FIG. 10 which are accessing the first communications resources using mode 1 operation. In a process step 1114, the UE 1110 is configured to determine, based on the system information indicating whether it is allowed to access the fast communications resources whether the system information it has received determines whether it is allowed to trigger an RRC connection establishment to perform mode 1 D2D communications using the first communications resources. Accordingly, if the UE 1110 is allowed access to the first communications resources to operate in mode 1 then the UE performs an RRC connection establishment procedure as represented by a double heading arrow 1116 in which it initiates a RRC connection establishment required for mode 1 operation provided it has the access rights to do so. Accordingly, after establishing an RRC connection then the UE 1110 can transmit a D2D communication to another UE within the group 1118 as represented by a message arrow 1120.

The operation of an eNodeB according to the present technique is summarised by the flow diagram shown in FIG. 13, which is explained as follows:

S1201: The eNodeB is provided with a transmitter, a receiver and a controller as explained above with reference to FIG. 10. The controller controls the formation of the wireless access interface by scheduling and allocating resources for transmission and reception by the UEs. The controller configures a first selection of communications resources of the wireless access interface as shown in FIG. 10 which can be allocated on request to communications devices via the controller for D2D communications in accordance with mode 1 operation.

S1202: The controller also in the present example configures second communications resources of the wireless access interface, which can be used for D2D communications in accordance with mode 2 operation using a D2D communications protocol. As explained above an example of a D2D communications protocol is provided in annex 1 which performs scheduling assignment transmission in accordance with a contentious access procedure for a resource from the second communications resources pool. Accordingly, the UEs access the second communications resources without reference to the eNodeB and therefore act autonomously.

S1204: The controller then identifies a class of each of the communications devices which is to perform D2D communications.

S1206: The controller of the eNodeB determines, depending on the class of each of the communications device, which is to perform D2D communications whether the UE can have access to one or more of the first communications resources or the wireless access interface or the second communications resources of the wireless access interface or both. Thus the controller may determine that a UE can only have access to the first communications resources in accordance with its class. Alternatively, an emergency services UE may be granted access to the second communications resources to perform D2D communications using mode 2.

S1208: The controller of the eNodeB generates for each of the one or more communications devices an indication as to whether or not the UE is allowed access to either the first communications resources of the wireless access interface or the second communications resources of the wireless access interface or both the first and the second communications resources depending on the class of the communications device.

S1210: The controller then controls the transmitter to transmit via the wireless access interface, via for example system information messages to each of the one or more UEs. The generated indication as to whether or not the UE can access the first or second communications resources or both the fast and second communications resources will depend on their class.

Figure 13:
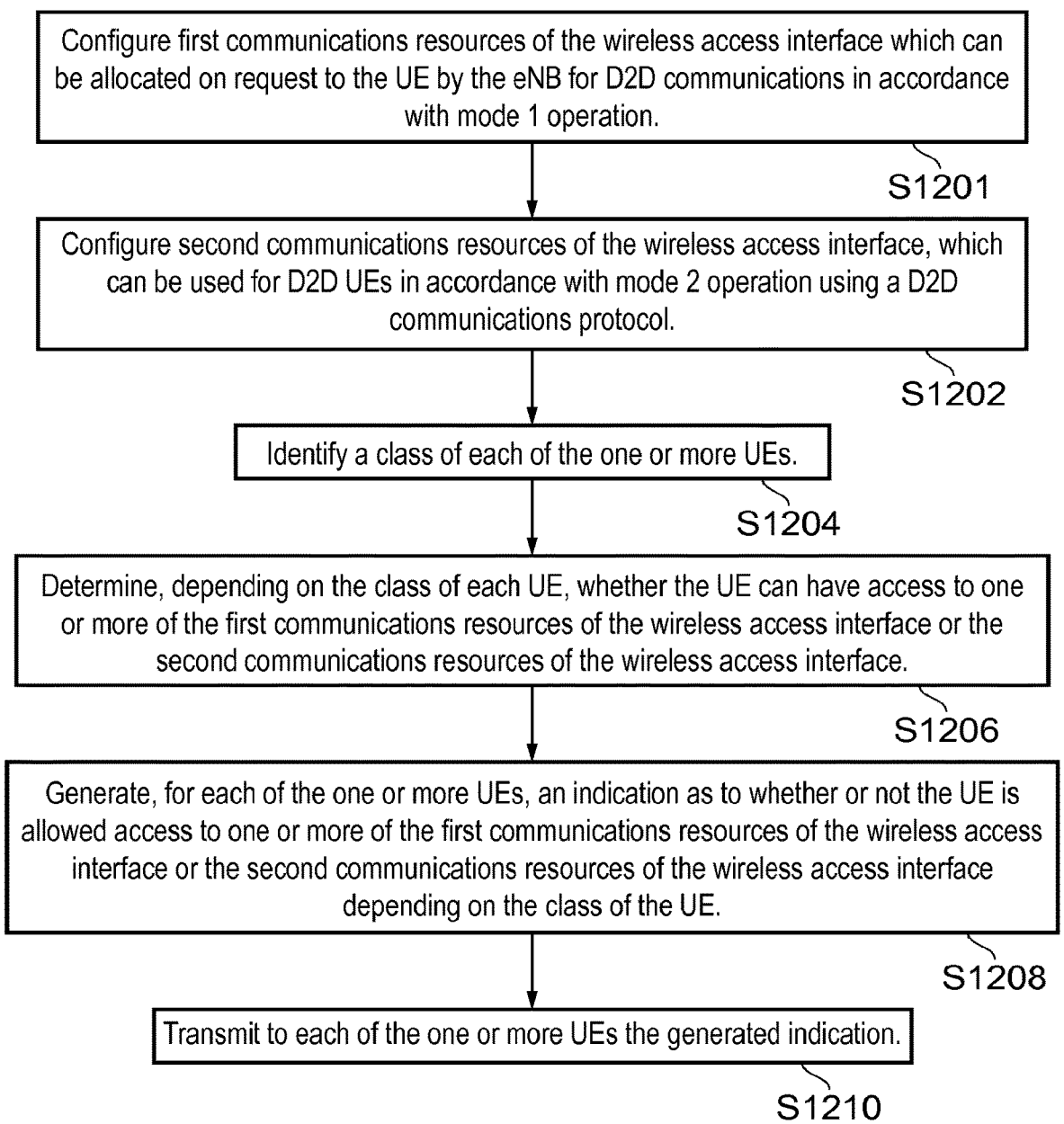
FIG. 13 is a flow diagram representing an example operation of an infrastructure equipment to communicate access restriction information to communications devices according to the present technique.
Figure 14:
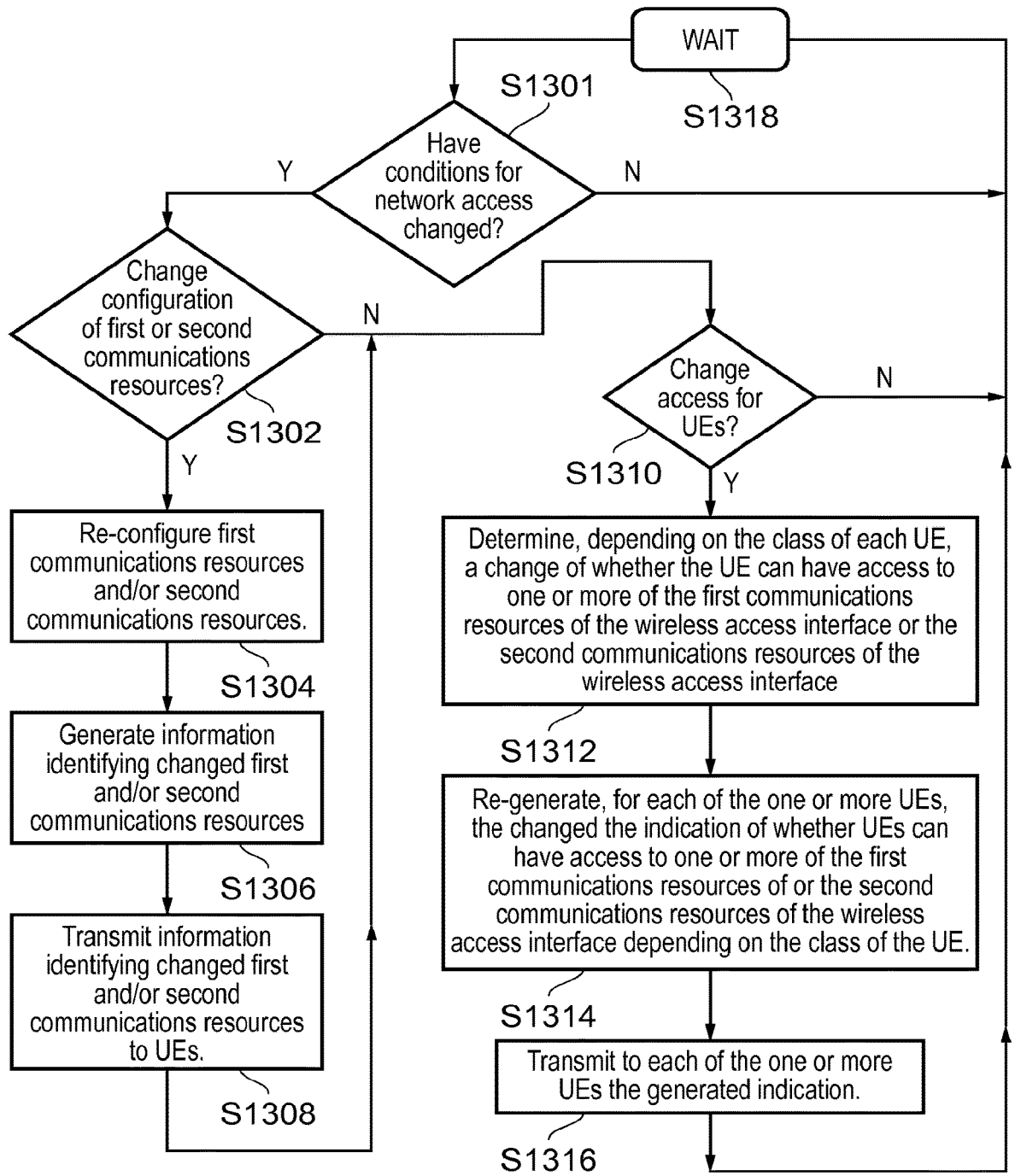
FIG. 14 is a flow diagram representing an example operation of an infrastructure equipment to communicate access restriction information to communications devices, when the conditions for network access change, according to the present technique.

In some example embodiments in addition to the process performed by the eNodeB in the flow diagram showing in FIG. 13 the eNodeB may change the access rights granted to particular classes of UE's independence upon predetermined conditions. The predetermined conditions may be that the mobile network operator is provided with an indication that an emergency has occurred and therefore changes the access rights to different classes of UEs for example giving greater access rights to emergency services UEs. In other examples the eNodeB or other parts of the mobile communications network may detect that congestion is present on the network and therefore may control access to the D2D communications and therefore wish to change the access allowed by the UEs to either the first and/or the second communications resources. FIG. 14 is summarised as follows:

S1301: In a first step the controller in the eNodeB determines whether the conditions for network access has changed.

S1302: The controller of the eNodeB then determines whether to change the configuration of the first or second communications resources. For example the eNodeB may determine that it wishes to change the relative proportion of communications resources allocated to the first communications resources compared to those of the second communications resources. If the answer is no then processing may move to step S1310.

S1304: If the controller of the eNodeB decides that it is appropriate to re-configure the first communications resources and/or the second communications resources then an adjustment is made in the relative proportion of these resources with respect to each other.

S1306: The controller then generates information identifying the change of the first and second communications resources.

S1308: The controller then transmits to the UE's performing D2D communications the information identifying the changed fast and/or second communications resources.

S1310: The controller then determines whether it is appropriate to change the access rights of UEs which may for example be dependent on the class of the UE and therefore may the different depending on the class of UE.

S1312: The controller of the eNodeB then determines depending on the class of each of the communications devices a change of whether the UE can have access to one or more of the first communications resources or the second communications resources of the wireless access interface.

S1314: The controller then regenerates, for each of the one or more UEs, the changed indication of whether the UE's can have access to either the first communications resources or the second communications resources or both, the first and the second communication resources depending on the class of the UE.

S1316: The controller then uses the transmitter to transmit the change in indication of access rights to the first and/or second communications resources using for example the system information transmission.

S1318: Processing then loops back to a wait state S1318 before proceeding again to determine whether conditions for network access have changed. As will be appreciated, changes can be communicated independently or together at the same time (see FIG. 14).

Figure 15:
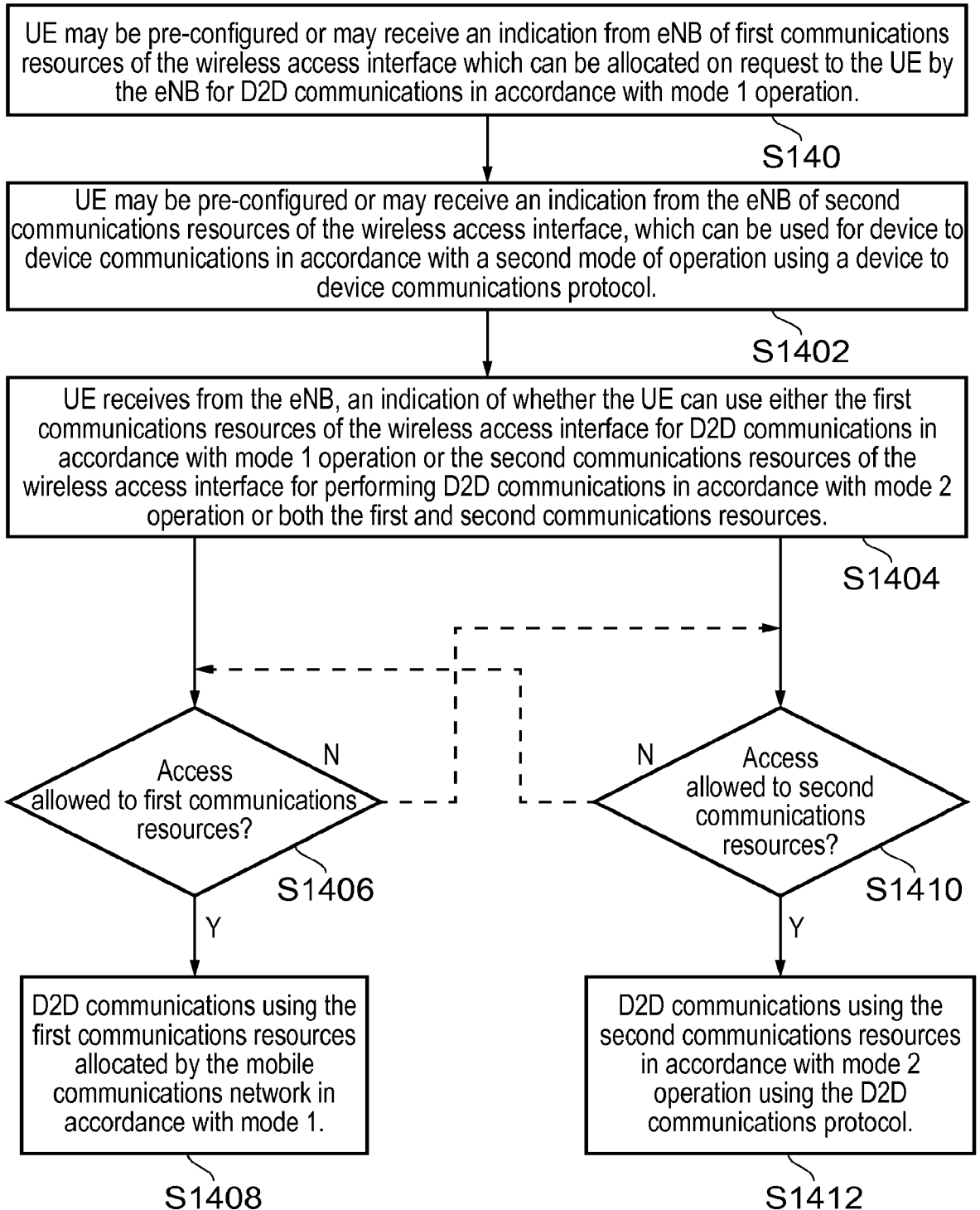
FIG. 15 is a flow diagram representing an example separation of a communications device performing D2D communications using access control information, according to the present technique.

The operation of the UE in configuring its D2D communications in accordance with its access rights to communications resource pools is summarised in FIG. 15. FIG. 15 is explained as follows:

S1401: The UE my be preconfigured or may receive an indication from the mobile communications network of a configuration of first communications resources of the wireless access interface, which can be used by the UE to request communications resources from the eNodeB to perform D2D communications in accordance with mode 1 operation.

S1402: The UE may also be preconfigured or may receive as indication from the eNodeB of second communications resources of a wireless access interface, which can be used for D2D communications in accordance with mode 2 operation. As explained above in mode 2 operation the UE requires the use of a D2D communications protocol for example using contention access.

S1404: The UE receives from the eNodeB an indication of whether the UE can use either the first communications resources of the wireless access interface for performing D2D communications in accordance with mode 1 operation or the second communications resources of the wireless access interface for performing D2D communications in accordance with mode 2 operation or access to both first and second communications resources.

S1406: The UE then determines whether it is allowed access to the first communications resources depending on its class then processing proceeds to step S1406 in which D2D communications are performed using the first communications resources by requesting and being granted access to the first communications resources via the eNodeB in accordance with mode 1 operation. In parallel or alternatively, the UE may determine whether it can use the second communications resources using mode 2 operation. Accordingly, in the step S1412 the UE performs D2D communications using the second communications resources in mode 2 using a D2D communications protocol for example by using contentious access.

Further Aspects

Is some example embodiments the mobile communications network may be configured to combine the indication provide to the UEs to control access to the communications resources in accordance with their class with access class barring and associate either the existing cell barring parameters, or signal additional D2D specific parameters.

Currently in LTE access classes 0-9 are categories which provide a priority class to "normal" devices. Access class 10 is for emergency calls. Access classes 11-15 are high priority classes. Public safety classes would typically be access class 12, 13, 14.

Access classes 8-9 can be provided with a probability of access before accessing the cell, the UE applies a randomly chosen valise against a threshold (representing the probability). The UE cannot access the cell if this check does not pass. Other access classes can be individually barred or allowed. Accordingly, each of the access class can be provided with an additional indication as to whether the UE performing D2D communications can have access to a communications resource pool according to its class and combine this with the probability of access and access waiting time to perform access control in a more graduated manner. For example 1 bit indicating access classes. 0-9 are allowed, and individual bits for at least classes 12, 13, 14.

Various further aspects and features of the present invention are defined in the appended claims. Embodiments of the present technique find application with any communications device, which may perform D2D communications for any scenario.

In some embodiments of the present technique the access control provided by the indicated access rights transmitted to UEs could be used by a receiving UE to determine which resources it should monitor in order to receive D2D transmissions. Accordingly, if the UE does not have access rights to a pool of communications resources allocated for D2D communications then a power saving can be achieved.

Annex 1: Example of Autonomous D2D Communications

Figure 16:
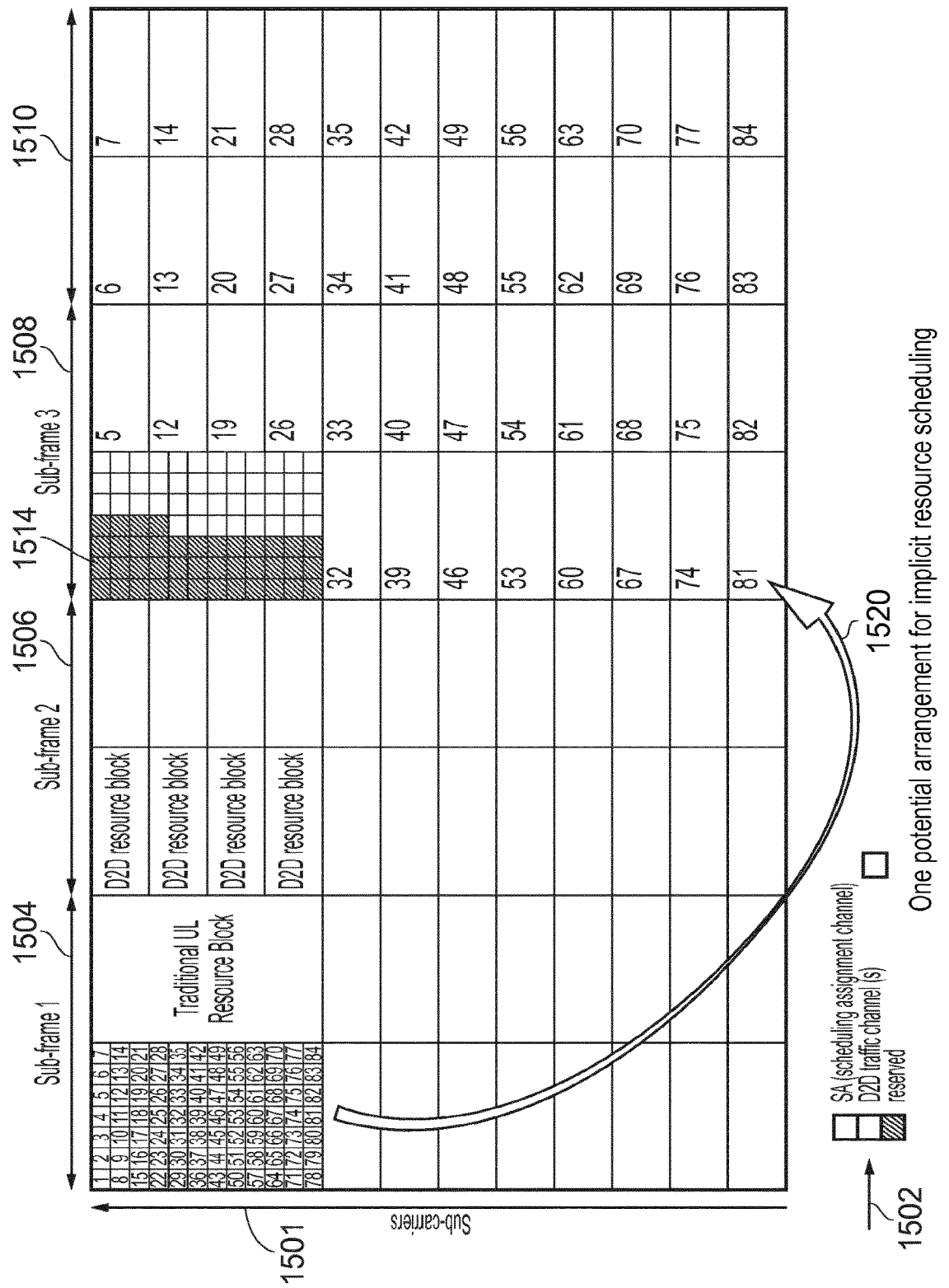
FIG. 16 is a schematic representation of a wireless access interface comprising a scheduling assignment region and regions shared communications resources and illustrating an operation in accordance with the present technique for supporting device-to-device communications.

An arrangement is which D2D communications can be performed between one or more UEs, which may form a group of UEs, without requiring a central entity to control the transmission of signals from the UEs to the other UEs of the group is briefly described, with reference to FIG. 16. According to this arrangement, a wireless access interface is provided which includes a scheduling assignment region or channel in which scheduling assignment messages may be transmitted in a plurality of sections of communications resources. Each of the plurality of communications resource has a corresponding section of resources of a shared communications channel. The transmission of a scheduling assignment message in one of the sections of the scheduling assignment region can provide an indication to all of the other devices in a group that a UE wishes to transmit signals representing data in a corresponding section of the shared communications resources.

In FIG. 16, the wireless access interface is formed from a plurality of OFDM sub carriers 1501 and a plurality of OFDM symbols 1502 which can be divided into sections of communications resources. As shown in FIG. 16, the wireless access interface is divided into time divided units of subframes 1504, 1506, 1508, 1510 of communications resource. As shown in FIG. 16, every other subframe includes a scheduling assignment region 1512, 1514. The scheduling assignment region includes a plurality of sections of communications resource which are numbered in FIG. 16 from 1 to 84. A remaining part of the subframes 1504, 1508 in which a scheduling assignment region 1512, 1514 is included is divided into a plurality of sections of shared communications resources. Other subframes in which there is no scheduling assignment region 1512, 1514 are divided into sections of shared communications resource for the transmission of signals representing data by the UE to other UEs within the group. However, in combination a plurality of sections of communications resources of shared resources are provided within two subframes 1504, 1506, 1508, 1510 and each of the sections of shared resource corresponds to one of the sections of the scheduling assignment region 1512, 1514. Accordingly, a transmission by a UE in one of the sections of the scheduling assignment region of a scheduling assignment message indicates to the other UEs within the group that the UE which transmitted the scheduling assignment message in that section of the scheduling assignment region intends to transmit data in a corresponding section of the shared communications resources in which data can be transmitted. Thus as represented by the arrow 1520, the transmission of a scheduling assignment in section 81 of the scheduling assignment region 1512 provides an indication to the other UEs in the group that the transmitting UE that transmitted the scheduling assignment message intends to transmit data in the section numbered 81 of the scheduling assignment resource.

FIG. 16 therefore shows a potential arrangement for implicit resource scheduling. For the example shown in FIG. 16, the scheduling assignment resource or region 1512 has been chosen to be one uplink resource block of a conventional LTE wireless access interface, transmitted every second subframe.

In some examples, the scheduling assignment message may include one or more identifiers which may include but are not limited to an identifier of the transmitting UE, an identifier of the destination device or devices, a logical channel identifier, transport channel identifier, and application identifier, or an identifier of the group of UEs depending upon the application. For example if the group of UEs were engaged in a push-to-talk communications session, then the scheduling assignment message would not need to identify the individual device, but only the group of UEs. Other devices within the group, which detect the transmission of the scheduling assignment message in a section of the scheduling assignment region will know not to attempt to transmit in the corresponding section of the shared communications resources for transmitting data and will detect the identifier of the group of UEs. The devices of the group will therefore know to listen and to receive the data transmitted by the transmitting UEs (UE), which transmitted the scheduling assignment message, which included the group identifier.

As shown in FIG. 16 the resource numbered 81 corresponds to a region in the next available communications resource for that number that is in the third subframes 708. Thus there is a corresponding delay between transmission of the scheduling assignment message and the transmission of the data in order to provide notice to the other UEs in the group that that particular section of the shared communications resources has been reserved by one of the UEs for transmission.

In order resolve a contentious access a two phase contention resolution process is proposed:

In a Phase 1: A fixed sequence of listening for resource reservations (and potentially listening also for on going data transmission or other information such as measurements from other UEs) or optionally in some example transmission of messages in a scheduling region.

If the UE detects the chosen resource is in use or being requested by another UE, the UE randomly picks another resource from the shared communications resources. The phase 1 may be repeated if the communications resources need to change.

This phase 1 solves collisions in most of the cases, with the exception being if two UE start listening at exactly the same subframe.

In Phase 2 the LIE transmits in the selected communications resources or in the case in which a scheduling channel is present, the UE transmits a message to inform the other UEs that it intends to transmit in the corresponding communications resources of the shared channel. After a random time a further listening process is performed to determine whether a collision has occurred because another UE is transmitting contemporaneously.

The UE may restart one or both of the phases if collision is detected.

The UE may also perform random backoff time before restarting.

This phase 2 is intended to address the case in which two UEs start at exactly the same time, and contention is not detected in phase 1. The random listening slot reduces overall probability of collision, so that the larger the number of preamble frames the lower the probability of collision.

The network or a co-ordinating UE may configure the length of the preamble phase based on e.g. number of devices in proximity.

In some example a counter may be incremented after each scheduling message transmission if this example embodiment is used. This can help to determine which UE should choose another resource in case of collision, for example if a scheduling message from another UE is defected with a higher counter, or if the UE detects another UE in phase 2, then a different set of communications resources can be chosen.

After the UE transmits the signals representing the data then, the UE may wait for a predetermined period or a random period before it makes an attempt to transmit further data to avoid collisions with other UEs.

According, to this arrangement a probability of collision between different transmitting UEs in proximity with one another is reduced compared to simply listening before transmitting. Furthermore, a relatively short delay for collision detection (in order of a few subframes) can the achieved, and a configurable preamble length can provide a facility for addressing different numbers of UEs in the system. For example a longer preamble length (the total number of subframes in phases 1 and 2) may be needed in case of high number of UEs to reduce collision probability.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

In the foregoing description D2D communications are described with reference to an LTE system, however the presently disclosed techniques are equally applicable to after LTE system structures and other systems which are compatible with D2D communications.

The following numbered paragraphs define further example aspects and features of the present technique:

Paragraph 1. A method of communicating using a communications device via a wireless access interface to perform device-to-device communications, the method comprising configuring the communications device with at least one of an indication of one or more first communications resources of the wireless access interface which can be allocated on request to the communications device by a mobile communications network for transmitting signals to one or more other communications devices or receiving signals from the one or more other communications devices in accordance with the first mode of operation, when the communications device is within a coverage area provided by the mobile communications network, and an indication of one or more second communications resources of the wireless access interface which can be used by the communications device for transmitting signals to one or more other communications devices or receiving signals from the one or more other communications devices in accordance with a second mode of operation using a device to device communications protocol, when the communications device is within the coverage area provided by the mobile communications network, and receiving, from the mobile communications network, an indication of whether the communications device can use at least one of the first communications resources of the wireless access interface for performing device-to-device communications in accordance with the first mode of operation or the second communications resources of the wireless access interface for performing device to device communications in accordance with the second mode of operation, and depending on the indication provided by the mobile communications network and the configuration of the one or more of the first communications resources, transmitting signals to the one or more other communications devices via the first communications resources allocated by the mobile communications network in accordance with a first mode of operation or receiving signals from the one or more other communications devices via the first communications resources, or depending on the indication provided by the mobile communications network and the configuration of the one or more of the second communications resources, transmitting signals to the one or more other communications devices via the second communications resources or receiving signals from the one or more other communications devices via the second communications resources in accordance with the second mode of operation using the device to device communications protocol.

Paragraph 2. A method of communicating according to paragraph 1, wherein the indication received by the communications device of whether the communications device can use at least one of the first communications resources of the wireless access interface for performing device-to-device communications in accordance with the first mode of operation or the second communications resources of the wireless access interface for performing device to device communications in accordance with the second mode of operation is dependent upon one of a plurality of predetermined classes of communications devices.

Paragraph 3. A method of communicating according to paragraph 1 or 2, comprising configuring the communications device with one of a predetermined plurality of classes, each of the predetermined classes indicating an access class, each, access class having associated therewith an access probability level and a wait time, determining in accordance with the access probability whether the communications device can transmit signals via the first communications resources or the second communications resources depending on the received indication at a current time, and if the communications device cannot transmit signals at the current time according to the access probability waiting for the wait time.

Paragraph 4. A method of communicating according to paragraph 1, 2 or 3, wherein the transmitting the signals, depending an the indication provided by the mobile communications network to the one or more other communications devices via the first communications resources allocated by the mobile communications network in accordance with a first mode of operation or transmitting the signals to the one or more other communications devices via the second communications resources via the second communications resources in accordance with the second mode of operation using the device to device communications protocol includes determining in accordance with predetermined conditions whether the communications device is within a coverage area for transmitting or receiving radio signals via the wireless access interface provided by a mobile communications network, and if the communications device is determined to be within the coverage area of the mobile communications network and has received the indication of communications resources for transmitting signals to one or more other communications devices, when within a coverage area of the mobile communications network, then depending on the indication and the configuration of the one or more of the first communications resources, transmitting the signals to the one or more other communications devices via the first communications resources allocated by the mobile communications network in accordance with a first mode of operation, or depending on the indication and the configuration of the one or more of the second communications resources, transmitting the signals to the one or more other communications devices via the second communications resources via the second communications resources in accordance with the second mode of operation/using the device to device communications protocol, or if the communications device is determined not to be within the coverage area of the mobile communications network, transmitting signals via the wireless access interface to one or more other communications devices in accordance with the device to device communications by accessing the first or second communications resources or one or more other communications resources of the wireless access in accordance with a second operating mode of a device to device communications protocol.

Paragraph 5. A method according to any of paragraphs 1 to 4, wherein the transmitting the signals to the one or more other communications devices via the second communications resources in accordance with the second mode of operation using the device to device communications protocol includes performing a contentious access procedure for the second communications resources Paragraph 6. A method of communicating according to any of paragraphs 1 to 5, wherein first communications resources and the second communications resources include one or more communications resources which are the same.

Paragraph. 7. A method of communicating according to any of paragraphs 1 to 6, comprising receiving, periodically, from the mobile communications network, information identifying at least one of the first communications resources of the wireless access interface or the second communications resources of the wireless access interface.

Paragraph 8. A communications device comprising a transmitter configured to transmit signals to one or more other communications devices via a wireless access interface to perform device-to-device communications, a receiver configured to receive signals from the one or more other communications devices via the wireless access interface, and a controller for controlling the transmitter and the receiver to transmit or to receive the signals via the wireless access interface to transmit or to receive date represented by the signals in accordance with a device to device communications, wherein the controller is provided with at least one of an indication of one or more first communications resources of the wireless access interface which can the allocated on request to the communications device by a mobile communications network for transmitting signals to one or more other communications devices or receiving signals from the one or more other communications devices in accordance with the first mode of operation, when the communications device is within a coverage area provided by the mobile communications network, and an indication of one or more second communications resources of the wireless access interface which can be used by the communications device for transmitting signals to one or more other communications devices or receiving signals from the one or more other communications devices in accordance with a second mode of operation using device to device communications protocol, when the communications device is within the coverage area provided by the mobile communications network, and the controller is configured in combination with the transmitter and the receiver to receive, from the mobile communications network, an indication of whether the communications device can use at least one of the first communications resources of the wireless access interface for performing device-to-device communications in accordance with the first mode of operation or the second communications resources of the wireless access interface for performing device to device communications in accordance with the second mode of operation, and depending on the indication provided by the mobile communications network and the configuration of the one or more of the first communications resources, to transmit signals to the one or more other communications devices via the first communications resources allocated by the mobile communications network in accordance with a first mode of operation or receiving signals from the one or more other communications devices via the first communications resources, or depending on the indication provided by the mobile communications network and the configuration of the one or more of the second communications resources, to transmit signals to the one or more, other communications devices via the second communications resources or receiving signals from the one or more other communications devices via the second communications resources in accordance with the second mode of operation using the device to device communications protocol.

Paragraph 9. A communications device according to paragraph 8, wherein the indication received by the communications device of whether the communications device can use at least one of the first communications resources of the tireless access interface for performing device-to-device communications in accordance with the first mode of operation, and the second communications resources of the wireless access interface for performing device to device communications in accordance with the second mode of operation is dependent upon one of a plurality of predetermined classes of communications devices.

Paragraph 10. A communications device according to paragraph 8 or 9, wherein the controller is provided with one of a predetermined plurality of classes, each of the predetermined classes indicating an access class, each access class having associated therewith an access probability level and a wait time, and the controller is configured in combination with the transmitter to determine in accordance with the access probability whether the communications device can transmit signals via the first communications resources or the second communications resources depending on the received indication at a current time, and if the communications device cannot transmit signals at the current time according to the access probability waiting for the wait time.

Paragraph 11. A communications device according to paragraph 8, 9 or 10, wherein the controller is configured in combination with the transmitter and the receiver to determine in accordance with predetermined conditions whether the communications device is within a coverage area for transmitting or receiving radio signals via the wireless access interface provided by a mobile communications network, and if the communications device is determined to be within the coverage area of the mobile communications network and has received the indication of communications resources for transmitting signals to one or more other communications devices, when within a coverage area of the mobile communications network, then depending on the indication and the configuration of the one or more of the first communications resources, to transmit the signals to the one or more other communications devices via the fast communications resources allocated by the mobile communications network in accordance with a first mode of operation, or depending on the indication and the configuration of the one or more of the second communications resources, to transmit the signals to the one or more other communications devices via the second communications resources via the second communications resources in accordance with the second mode of operation using the device to device communications protocol, or if the communications device is determined not to be within the coverage area of the mobile communications network, to transmit the signals via the wireless access interface to one or more other communications devices in accordance with the device to device communications by accessing the first or second communications resources or one or more other communications resources of the wireless access in accordance with a second operating mode of a device to device communications protocol.

Paragraph 12. A communications device according to any of paragraphs 8 to 11, wherein the controller is configured in combination with the transmitter and the receiver to transmit the signals to the one or more other communications devices via the second communications resources in accordance with the second mode of operation using the device to device communications protocol by performing a contentious access procedure for the second communications resources Paragraph 13. A communications device according to any of paragraphs 8 to 11, wherein first communications resources and the second communications resources include one or more communications resources which are the same.

Paragraph 14. A communications device according to any of paragraphs 8 to 13, wherein the controller is configured in combination with the receiver to receive, periodically, from the mobile communications network information identifying at least one of the first communications resources of the wireless access interface or the second communications resources of the wireless access interface.

Paragraph 15. A method of communicating using an infrastructure equipment forming part of a mobile communications network, the method comprising transmitting signals to communications devices via a wireless access interface, receiving signals from the communications devices via the wireless access interface, and controlling the transmitting and the receiving to form the wireless access interface, wherein the controlling the transmitting comprises transmitting an indication to each of one or more of the communications devices identifying whether the communications device is allowed to access at least one of first communications resources of the wireless access interface which can be allocated on request to the communications device by the infrastructure equipment for transmitting signals from the commutations device to one or more others of the communications devices or receiving signals from the one or more other communications devices in accordance with the first mode of operation, when the communications device is within a coverage area provided by the infrastructure equipment and second communications resources of the wireless access interface, which can be used by the communications device for transmitting signals to one or more others of the communications devices or receiving signals from the one or more other communications devices in accordance with a second mode of operation using de vice to device communications protocol, when the communications device is within the coverage area provided by the mobile communications network.

Paragraph 16. A method according to paragraph 15, wherein the transmitting the indication to each of one or more, of the communications devices identifying whether the communications device is allowed to access at least one of the first communications resources or the second communications resources, comprises identifying a class of each of the one or more communications devices, determining, depending on the class of each communications device, whether the communications de vice can have access, to one or more of the first communications resources of the wireless access interface or the second communications resources of the wireless access interface, generating, for each of the one or more communications devices, the indication as to whether or not the communications device is allowed access to one or more of the first communications resources of the wireless access interface or the second communications resources of the wireless access interface depending on the class of the communications device, and to transmitting to each of the one or more communications device the generated indication for the communications device.

Paragraph 17. A method according to paragraph 16, wherein the transmitting the indication to each of one or more of the communications devices identifying whether the communications device is allowed to access at least one of the first communications resources or the second communications resources, comprises determining in accordance with predetermined conditions a change on whether each of the one or more communications devices can have access to one or more of the first communications resources of the wireless, access interface or the second communications resources of the wireless access interface, regenerating, for each of the one or more communications devices, in accordance with the change the indication as to whether or not the communications device is allowed access to one or mare of the first communications resources of the wireless access interface or the second communications resources of the wireless access interface depending on the class of the communications device, and transmitting to each of the one or more communications device the changed indication for the communications device.

Paragraph 18. A method of communicating according to any of paragraphs 15 to 17, comprising determining a configuration, of the first communications resources of the wireless access interface and the second communications resources of the wireless access interface, generating information identifying the first communications resources and the second communications resources, and transmitting, periodically, to the one or more communications devices, information identifying at least one of the first communications resources of the wireless access interface or the second communications resources of the wireless access interface.

Paragraph 19. A method of communicating according to any of paragraphs 15 to 18, comprising determining, in accordance with predetermined conditions, a change in the configuration of the first communications resources of the wireless access interface and the second communications resources of the wireless access interface, generating information identifying the changed first communications resources and the changed second communications resources, and transmitting, periodically, to the one or more communications devices, information identifying the change of the at least one of the first communications resources of the wireless access interface or the second communications resources of the wireless access interface.

Paragraph 20. A method of communicating according to any of paragraphs 17, 18 or 19, wherein the predetermined conditions for changing the indication include an emergency state or a congested state.

Paragraph 21. An infrastructure equipment for forming part of a mobile communications network, the infrastructure equipment comprising a transmitter configured to transmit signals to communications devices via a wireless access interface, a receiver configured to receive signals from to the communications devices via the wireless access interface, and a controller far controlling the transmitter and the receiver to form the wireless access interface for transmitting or to receiving the signals to the one or more communications devices, wherein the controller is configured in combination with the transmitter to transmit an indication to each of one or more of the communications devices identifying whether the communications device, is allowed to access at least one of first communications resources of the wireless access interface which can the allocated on request to the communications device by the infrastructure equipment for transmitting signals from the communications device to one or more others of the communications devices or receiving signals from the one or more other communications devices in accordance with the first mode of operation, when the communications device is within a coverage area provided by the infrastructure equipment, or second communications resources of the wireless access interface which can be used by the communications device for transmitting signals to one or more others of the communications devices or receiving signals from the one or more other communications devices in accordance with a second mode of operation using device to device communications protocol, when the communications device is within the coverage area provided by the mobile communications network.

Paragraph 22. An infrastructure equipment according to paragraph 21, wherein the controller is configured to identify a class of each of the one or more communications devices, to determine, depending on the class of each communications device, whether the communications device can have access to one or more of the first communications resources of the wireless access interface or the second communications resources of the wireless access interface, to generate, for each of the one or more communications devices, the indication as to whether or not the communications device is allowed access to one or more of the first communications resources of the wireless access interface or the second communications resources of the wireless access interface depending on the class of the communications device, and the controller is configured in combination with the transmitter to transmit to each of the one or more communications device the generated indication for the communications device.

Paragraph 23. An infrastructure equipment according to paragraph 22, wherein the controller is configured to determine in accordance with predetermined conditions a change on whether each of the one or more communications devices can have access to one or more of the first communications resources of the wireless access interface or the second communications resources of the wireless access interface, to re-generate, for each of the one or more communications devices, in accordance with the change the indication as to whether or not the communications device is allowed access to one or more of the first communications resources of the wireless access interface or the second communications resources of the wireless access interface depending on the class of the communications device, and the controller is configured in combination with, the transmitter to transmit to each of the one or more communications device the changed indication for the communications device.

Paragraph 24. An infrastructure equipment according to any of paragraphs 21 to 23, wherein the controller is configured to determine a configuration, of the first communications resources of the wireless access interface and the second communications resources of the wireless access interface.

to generate information identifying the first communications resources and the second communications resources, and the controller is configured is combination with the transmitter to transmit, periodically, to the one or more communications devices, information identifying at least one of the first communications resources of the wireless access interface or the second communications resources of the wireless access interface.

Paragraph 25. An infrastructure equipment according to any of paragraphs 21 to 24, wherein the controller is configured to determine, in accordance with predetermined conditions, a change in the configuration of the first communications resources of the wireless access interface and the second communications resources of the wireless access interface, to generate information identifying the changed first communications resources and the changed second communications resources, and the controller is configured in combination with the transmitter to transmit, periodically, to the one or more communications devices, information identifying the change of the at least one of the first communications resources of the wireless access interface or the second communications resources of the wireless access interface.

Paragraph 26. An infrastructure equipment according to any of paragraphs 23, 24 or 25, wherein the predetermined conditions for changing the indication include an emergency state or a congested state.

Paragraph 27. A communications device comprising a transmitter circuitry configured to transmit signals to one or more other communications devices via a wireless access interface to perform device-to-device communications, a receiver circuitry configured to receive signals from the one or more other communications devices via the wireless access interface, and a controller circuitry for controlling the transmitter and the receiver to transmit or to receive the signals via the wireless access interface to transmit or to receive data represented by the signals in accordance with a device to device communications, wherein the controller circuitry is provided with at least one of an indication of one or more first communications resources of the wireless access interface which can be allocated on request to the communications device by a mobile communications network for transmitting signals to one or more other communications devices or receiving signals from the one or more other communications devices in accordance with the first mode of operation, when the communications device is within a coverage area provided by the mobile communications network, and an indication of one or more second communications resources of the wireless access interface which can be used by the communications device for transmitting signals to one or more other communications devices or receiving signals from the one or more other communications devices in accordance with a second mode of operation using device to device communications protocol, when the communications device is within the coverage area provided by the mobile communications network, and the controller circuitry is configured in combination with the transmitter circuitry and the receiver circuitry to receive, from the mobile communications network, an indication of whether the communications device can use at least one of the first communications resources of the wireless access interface for performing device-to-device communications in accordance with the first mode of operation or the second communications resources of the wireless access interface for performing device is device communications in accordance with the second mode of operation, and depending on the indication prodded by the mobile communications network and the configuration of the one or more of the first communications resources, to transmit signals to the one or more other communications devices via the first communications resources allocated by the mobile communications network in accordance with a first mode of operation or receiving signals from the one or more other communications devices via the first communications resources, or depending on the indication provided by the mobile communications network and the configuration of the one or more of the second communications resources, to transmit signals to the one or more other communications devices via the second communications resources or receiving signals from the one or more other communications devices via the second communications resources in accordance with the second mode of operation using the device to device communications protocol.

REFERENCES

[1] R2-133840, "CSMA/CA based resource selection," Samsung, published at 3GPP TSG-RAN WG2#84, San Francisco, USA, 11-15 Nov. 2013.
[2] R2-133990, "Network control for Public Safety D2D Communications" Orange, Huawei, HiSilicon, Telecom Italia, published at 3GPP TSG-RAN WG2#84, San Francisco, USA, 11-15 Nov. 2013.
[3] R2-134246, "The Synchronizing Central Node for Out of Coverage D2D Communication", General Dynamics Broadband UK, published at 3GPP TSG-RAN WG2#84, San Francisco, USA, 11-15 Nov. 2013.
[4] R2-134426, "Medium Access for D2D communication", LG Electronics Inc, published at 3GPP TSG-RAN WG2#14, San Francisco, USA, 11-15 Nov. 2013.
[5] R2-134238, "D2D Scheduling Procedure", Ericsson, published at 3GPP TSG-RAN WG2#84, San Francisco, USA, 11-15 Nov. 2013.
[6] R2-134248 "Possible mechanisms for resource selection in connectionless D2D voice communication", General Dynamics Broadband UK, published at 3GPP TSG-RAN WG2#84, San Francisco, USA, 11-15 Nov. 2013.
[7] R2-134431, "Simulation results for D2D voice services using connectionless approach", General Dynamics Broadband UK, published at 3GPP TSG-RAN WG2#84, San Francisco, USA, 11-15 Nov. 2013.
[8] "D2D Resource Allocation under the Control of BS", Xiaogang R. et al, University of Electronic Science and Technology of China, https://mentor.ieee.org/802.16/dcn/13/16-13-0123-02-000n-d2 d-resource-allocation-under-the-control-of-bs.docx
[9] US20130176387
[10] US20120300662
[11] LTE for UMTS: OFDMA and SC-FDMA Based Radio Access, Harris Holma and Antti Toskala, Wiley 2009, ISBN 978-0-470-99401-6.
[12] Study on LTE Device to Device Proximity Services, Qualcomm Incorporated, RP-122009.
[13] EP14153512.0
[14] EP14153530.2
[15] EP 09933214

The invention claimed is:
1. A communications device comprising:
a transmitter configured to transmit signals to one or more other communications devices via a wireless access interface to perform device-to-device communications;
a receiver configured to receive signals from the one or more other communications devices via the wireless access interface; and
a controller configured, in combination with the transmitter and receiver, to control the transmitter and the receiver to transmit or to receive the signals via the wireless access interface to transmit or to receive data represented by the signals in accordance with a device to device communications, wherein the controller is configured to be provided with
an indication of one or more first communications resources of the wireless access interface which can be allocated on request to the communications device by a mobile communications network for transmitting signals to one or more other communications devices or receiving signals from the one or more other communications devices in accordance with the first mode of operation, when the communications device is within a coverage area provided by the mobile communications network, and
an indication of one or more second communications resources of the wireless access interface which can be used by the communications device for transmitting signals to one or more other communications devices or receiving signals from the one or more other communications devices in accordance with the second mode of operation using device to device communications protocol, when the communications device is within the coverage area provided by the mobile communications network, and
the controller is configured in combination with the transmitter and the receiver to
receive, from the mobile communications network, an indication of whether the communications device can use at least one of the first communications resources of the wireless access interface for performing device-to-device communications in accordance with the first mode of operation or the second communications resources of the wireless access interface for performing device to device communications in accordance with the second mode of operation; and
in a case that the indication provided by the mobile communications network indicates that the communications device can use the at least one of the first communications resources of the wireless access interface for performing device-to-device communications in accordance with the first mode of operation, transmit signals to the one or more other communications devices via the first communications resources allocated by the mobile communications network in accordance with a first mode of operation or receiving signals from the one or more other communications devices via the first communications resources, and in a case that the indication provided by the mobile communications network indicates that the communications device can use the at least one of the second communications resources of the wireless access interface for performing device-to-device communications in accordance with the second mode of operation, transmit signals to the one or more other communications devices via the second communications resources or receiving signals from the one or more other communications devices via the second communications resources in accordance with the second mode of operation using the device to device communications protocol.

2. The communications device of claim 1, wherein the indication received by the communications device of whether the communications device can use at least one of the first communications resources of the wireless access interface for performing device-to-device communications in accordance with the first mode of operation, and the second communications resources of the wireless access interface for performing device to device communications in accordance with the second mode of operation is dependent upon one of a plurality of predetermined classes of communications devices.

3. The communications device of claim 1, wherein the controller is provided with one of a predetermined plurality of classes, each of the predetermined classes indicating an access class, each access class having associated therewith an access probability level and a wait time, and the controller is configured in combination with the transmitter to determine in accordance with the access probability whether the communications device can transmit signals via the first communications resources or the second communications resources depending on the received indication at a current time, and if the communications device cannot transmit signals at the current time according to the access probability waiting for the wait time.

4. The communications device of claim 1, wherein the controller is configured in combination with the transmitter and the receiver to:

determine in accordance with predetermined conditions whether the communications device is within a coverage area for transmitting or receiving radio signals via the wireless access interface provided by a mobile communications network, and if the communications device is determined to be within the coverage area of the mobile communications network and has received the indication of communications resources for transmitting signals to one or more other communications devices, when within a coverage area of the mobile communications network, then depending on the indication and a configuration of the one or more of the first communications resources, transmit the signals to the one or more other communications devices via the first communications resources allocated by the mobile communications network in accordance with a first mode of operation, or depending on the indication and a configuration of the one or more of the second communications resources, transmit the signals to the one or more other communications devices via the second communications resources via the second communications resources in accordance with the second mode of operation using the device to device communications protocol, or if the communications device is determined not to be within the coverage area of the mobile communications network, transmit the signals via the wireless access interface to one or more other communications devices in accordance with the device to device communications by accessing the first or second communications resources or one or more other communications resources of the wireless access in accordance with a second operating mode of a device to device communications protocol.

5. The communications device of claim 1, wherein the controller is configured in combination with the transmitter and the receiver to transmit the signals to the one or more other communications devices via the second communications resources in accordance with the second mode of operation using the device to device communications protocol by performing a contentious access procedure for the second communications resources.

6. The communications device of claim 1, wherein first communications resources and the second communications resources include one or more communications resources which are the same.

7. An infrastructure equipment for forming part of a mobile communications network, the infrastructure equipment comprising:

a transmitter configured to transmit signals to communications devices via a wireless access interface;

a receiver configured to receive signals from to the communications devices via the wireless access interface; and a controller for controlling the transmitter and the receiver to form the wireless access interface for transmitting or to receiving the signals to the one or more communications devices, wherein the controller is configured in combination with the transmitter to transmit an indication to each of one or more of the communications devices identifying whether the communications device, is allowed to access first communications resources of the wireless access interface which can be allocated on request to the communications device by the infrastructure equipment for transmitting signals from the communications device to one or more others of the communications devices or receiving signals from the one or more other communications devices in accordance with the first mode of operation, in a case that the communications device is within a coverage area provided by the infrastructure equipment and the communications device is allowed to use the first communications resources of the wireless access interface in accordance with the first mode of operation, and second communications resources of the wireless access interface which can be used by the communications device for transmitting signals to one or more others of the communications devices or receiving signals from the one or more other communications devices in accordance with a second mode of operation using device to device communications protocol, in a case that the communications device is within the coverage area provided by the mobile communications network and the communications device is allowed to use the second communications resources of the wireless access interface in accordance with the second mode of operation.

8. The infrastructure equipment of claim 7, wherein the controller is configured to:
identify a class of each of the one or more communications devices; and
determine, depending on the class of each communications device, whether the communications device can have access to one or more of the first communications resources of the wireless access interface or the second communications resources of the wireless access interface, to generate, for each of the one or more communications devices, the indication as to whether or not the communications device is allowed access to one or more of the first communications resources of the wireless access interface or the second communications resources of the wireless access interface depending on the class of the communications device, and
the controller is configured in combination with the transmitter to transmit to each of the one or more communications device the generated indication for the communications device.

9. The infrastructure equipment of claim 8, wherein the controller is configured to:
determine in accordance with predetermined conditions a change on whether each of the one or more communications devices can have access to one or more of the first communications resources of the wireless access interface or the second communications resources of the wireless access interface; and
re-generate, for each of the one or more communications devices, in accordance with the change the indication as to whether or not the communications device is allowed access to one or more of the first communications resources of the wireless access interface or the second communications resources of the wireless access interface depending on the class of the communications device, and
the controller is configured in combination with the transmitter to transmit to each of the one or more communications device the changed indication for the communications device.

10. The infrastructure equipment of claim 9, wherein the predetermined conditions for changing the indication include an emergency state or a congested state.

11. The infrastructure equipment of claim 7, wherein the controller is configured to:
determine a configuration of the first communications resources of the wireless access interface and the second communications resources of the wireless access interface; and
generate information identifying the first communications resources and the second communications resources, and
the controller is configured in combination with the transmitter to transmit, periodically, to the one or more communications devices, information identifying at least one of the first communications resources of the wireless access interface or the second communications resources of the wireless access interface.

12. The infrastructure equipment of claim 7, wherein the controller is configured to:
determine, in accordance with predetermined conditions, a change in the configuration of the first communications resources of the wireless access interface and the second communications resources of the wireless access interface; and
generate information identifying the changed first communications resources and the changed second communications resources, and
the controller is configured in combination with the transmitter to transmit, periodically, to the one or more communications devices, information identifying the change of the at least one of the first communications resources of the wireless access interface or the second communications resources of the wireless access interface.

13. A communications device comprising:
transmitter circuitry configured to transmit signals to one or more other communications devices via a wireless access interface to perform device-to-device communications;
receiver circuitry configured to receive signals from the one or more other communications devices via the wireless access interface; and
controller circuitry for controlling, in combination with the transmitter circuitry and the receiver circuitry, the transmitter and the receiver to transmit or to receive the signals via the wireless access interface to transmit or to receive data represented by the signals in accordance with a device to device communications, wherein
the controller circuitry is configured to be provided with
an indication of one or more first communications resources of the wireless access interface which can be allocated on request to the communications device by a mobile communications network for transmitting signals to one or more other communications devices or receiving signals from the one or more other communications devices in accordance with the first mode of operation, when the communications device is within a coverage area provided by the mobile communications network, and
an indication of one or more second communications resources of the wireless access interface which can be used by the communications device for transmitting signals to one or more other communications devices or receiving signals from the one or more other communications devices in accordance with a second mode of operation using device to device communications protocol, when the communications device is within the coverage area provided by the mobile communications network, and
the controller circuitry is configured in combination with the transmitter circuitry and the receiver circuitry to
receive, from the mobile communications network, an indication of whether the communications device can use at least one of the first communications resources of the wireless access interface for performing device-to-device communications in accordance with the first mode of operation or the second communications resources of the wireless access interface for performing device to device communications in accordance with the second mode of operation, and
in a case that the indication provided by the mobile communications network indicates that the communications device can use the at least one of the first communications resources of the wireless access interface for performing device-to-device communications in accordance with the first mode of operation, transmit signals to the one or more other communications devices via the first communications resources allocated by the mobile communications network in accordance with a first mode of operation or receiving signals from the one or more other communications devices via the first communications resources, and in a case that the indication provided by the mobile communications network indicates that the communications device can use the at least one of the second communications resources of the wireless access interface for performing device-to-device communications in accordance with the second mode of operation, transmit signals to the one or more other communications devices via the second communications resources or receiving signals from the one or more other communications devices via the second communications resources in accordance with the second mode of operation using the device to device communications protocol.

14. The communications device of claim 13, wherein the indication received by the communications device of whether the communications device can use at least one of the first communications resources of the wireless access interface for performing device-to-device communications in accordance with the first mode of operation, and the second communications resources of the wireless access interface for performing device to device communications in accordance with the second mode of operation is dependent upon one of a plurality of predetermined classes of communications devices.

15. The communications device of claim 13, wherein the controller circuitry is provided with one of a predetermined plurality of classes, each of the predetermined classes indicating an access class, each access class having associated therewith an access probability level and a wait time, and the controller circuitry is configured in combination with the transmitter circuitry to determine in accordance with the access probability whether the communications device can transmit signals via the first communications resources or the second communications resources depending on the received indication at a current time, and if the communications device cannot transmit signals at the current time according to the access probability waiting for the wait time.

16. The communications device of claim 13, wherein the controller circuitry is configured in combination with the transmitter circuitry and the receiver circuitry to:

determine in accordance with predetermined conditions whether the communications device is within a coverage area for transmitting or receiving radio signals via the wireless access interface provided by a mobile communications network, and if the communications device is determined to be within the coverage area of the mobile communications network and has received the indication of communications resources for transmitting signals to one or more other communications devices, when within a coverage area of the mobile communications network, then depending on the indication and a configuration of the one or more of the first communications resources, transmit the signals to the one or more other communications devices via the first communications resources allocated by the mobile communications network in accordance with a first mode of operation, or depending on the indication and a configuration of the one or more of the second communications resources, transmit the signals to the one or more other communications devices via the second communications resources via the second communications resources in accordance with the second mode of operation using the device to device communications protocol, or if the communications device is determined not to be within the coverage area of the mobile communications network, transmit the signals via the wireless access interface to one or more other communications devices in accordance with the device to device communications by accessing the first or second communications resources or one or more other communications resources of the wireless access in accordance with a second operating mode of a device to device communications protocol.

17. The communications device of claim 13, wherein the controller circuitry is configured in combination with the transmitter circuitry and the receiver circuitry to transmit the signals to the one or more other communications devices via the second communications resources in accordance with the second mode of operation using the device to device communications protocol by performing a contentious access procedure for the second communications resources.

18. The communications device of claim 13, wherein first communications resources and the second communications resources include one or more communications resources which are the same.

* * * * *